United States Patent
Ishikura et al.

(10) Patent No.: US 10,466,850 B2
(45) Date of Patent: Nov. 5, 2019

(54) ERASER DEVICE AND COMMAND INPUT SYSTEM

(71) Applicant: Sharp Kabushiki Kaisha, Sakai, Osaka (JP)

(72) Inventors: Tomoya Ishikura, Sakai (JP); Hiroaki Hara, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 106 days.

(21) Appl. No.: 15/735,302

(22) PCT Filed: Oct. 6, 2015

(86) PCT No.: PCT/JP2015/078405
§ 371 (c)(1),
(2) Date: Dec. 11, 2017

(87) PCT Pub. No.: WO2016/199320
PCT Pub. Date: Dec. 15, 2016

(65) Prior Publication Data
US 2018/0181231 A1    Jun. 28, 2018

(30) Foreign Application Priority Data

Jun. 12, 2015  (JP) .................................. 2015-119596

(51) Int. Cl.
*G06F 3/033*    (2013.01)
*G06F 3/041*    (2006.01)
(Continued)

(52) U.S. Cl.
CPC ............ *G06F 3/044* (2013.01); *G06F 3/0488* (2013.01); *G06F 3/0354* (2013.01);
(Continued)

(58) Field of Classification Search
CPC ............... G06F 3/0354; G06F 3/03543; G06F 3/03545; G06F 3/0383; G06F 3/041;
(Continued)

(56) References Cited

U.S. PATENT DOCUMENTS 5,475,401 A * 12/1995 Verrier ................. G06F 3/03545
178/18.03
5,793,360 A *  8/1998 Fleck ....................... G06F 3/023
178/19.01
(Continued)

FOREIGN PATENT DOCUMENTS

JP           08-263212 A    10/1996
JP         2013-012057 A     1/2013

*Primary Examiner* — Michael J Eurice
(74) *Attorney, Agent, or Firm* — Keating & Bennett, LLP

(57) ABSTRACT

An eraser device 4 for inputting an erase-operation of a display image to a touch panel 2, the touch panel 2 includes an input point detection unit 31 for detecting, as input points based on a plurality of detection points arranged on or near to a display screen, detecting points where a touch operation is performed; and an erase-operation determination unit 32 for determining whether or not a user's operation is the erase-operation, according to a degree of density of the input points, wherein the eraser device 4 includes a plurality of touch parts (pillar parts 48) to be detected as the input points when brought into contact with or closer to the touch panel, and the plurality of touch parts (pillar parts 48) are formed at such a degree of density that it is determined by the erase-operation determination unit that the erase-operation is being performed. Accordingly, an improved command input system for easily performing the erase-operation to the touch panel can be provided, inexpensively.

17 Claims, 22 Drawing Sheets

(51) Int. Cl.
*G06F 3/044* (2006.01)
*G06F 3/0488* (2013.01)
*G06F 3/038* (2013.01)
*G06F 3/0354* (2013.01)

(52) U.S. Cl.
CPC ........ *G06F 3/0383* (2013.01); *G06F 3/03543* (2013.01); *G06F 3/03545* (2013.01); *G06F 3/041* (2013.01); *G06F 3/04883* (2013.01)

(58) Field of Classification Search
CPC ...... G06F 3/0416; G06F 3/044; G06F 3/0488; G06F 3/04883; G06F 17/24; G06F 2203/04101
See application file for complete search history.

(56) References Cited

U.S. PATENT DOCUMENTS

| | | | | |
|---|---|---|---|---|
| 6,046,420 A * | 4/2000 | DeMoss | ................. | H01H 13/12 200/237 |
| 6,501,463 B1 * | 12/2002 | Dahley | ................... | G01L 1/205 345/156 |
| 6,948,210 B1 * | 9/2005 | Shah | ................... | B43L 19/0006 15/246 |
| 10,105,984 B2 | 10/2018 | Kumar | ................... | G06F 3/0346 |
| 2002/0024499 A1 * | 2/2002 | Karidis | ................. | G06F 1/1616 345/156 |
| 2004/0140964 A1 * | 7/2004 | Wang | ................... | G06F 3/03545 345/179 |
| 2004/0246236 A1 * | 12/2004 | Hildebrandt | ............ | G06F 3/038 345/169 |
| 2008/0143691 A1 * | 6/2008 | Cook | ................... | G06F 3/03545 345/179 |
| 2009/0008162 A1 * | 1/2009 | Yang | ................... | G06F 3/03545 178/18.06 |
| 2009/0309839 A1 * | 12/2009 | Hildebrandt | .......... | G06F 3/0321 345/173 |
| 2011/0310066 A1 * | 12/2011 | Fermgard | ................ | B43K 8/00 345/179 |
| 2012/0029907 A1 * | 2/2012 | Loggins | ................. | G09B 19/06 704/9 |
| 2012/0206330 A1 * | 8/2012 | Cao | ....................... | G06F 3/0383 345/156 |
| 2012/0249432 A1 * | 10/2012 | Ge | ......................... | G06F 3/488 345/173 |
| 2012/0293425 A1 * | 11/2012 | Lee | ..................... | G06F 3/03545 345/173 |
| 2013/0047093 A1 * | 2/2013 | Reuschel | ............ | G06F 3/04883 715/753 |
| 2013/0201162 A1 * | 8/2013 | Cavilia | ............... | G06F 3/03545 345/179 |
| 2013/0249815 A1 * | 9/2013 | Dolan | ................... | G06F 3/0483 345/173 |
| 2014/0055400 A1 * | 2/2014 | Reuschel | ................ | G06F 9/452 345/173 |
| 2014/0300558 A1 * | 10/2014 | Yamaguchi | ........... | G06F 3/0416 345/173 |
| 2015/0154442 A1 * | 6/2015 | Takahashi | .............. | G06K 9/222 345/156 |
| 2015/0172932 A1 * | 6/2015 | Bathiche | ............... | G06F 13/122 710/17 |
| 2015/0205367 A1 * | 7/2015 | Bandt-Horn | .......... | G06F 3/0202 345/156 |
| 2015/0212600 A1 * | 7/2015 | Zerayohannes | ..... | G06F 3/03545 345/179 |
| 2015/0212601 A1 * | 7/2015 | Zerayohannes | ..... | G06F 3/03545 345/179 |
| 2015/0248215 A1 * | 9/2015 | Graf | .................... | G06F 3/04812 715/822 |
| 2016/0041635 A1 * | 2/2016 | Michihata | ........... | G06F 3/03545 345/179 |
| 2016/0098142 A1 * | 4/2016 | Winebrand | ........... | G06F 3/0416 345/174 |
| 2016/0364023 A1 * | 12/2016 | Bathiche | ............. | G06F 3/03545 |
| 2017/0038896 A1 * | 2/2017 | Lee | ..................... | G06F 3/03545 |
| 2017/0083120 A1 * | 3/2017 | Huang | ................. | G06F 3/03545 |
| 2017/0153720 A1 * | 6/2017 | Yeh | ..................... | G06F 3/03545 |
| 2017/0192549 A1 * | 7/2017 | Katayama | ............... | G06F 3/041 |
| 2017/0192737 A1 * | 7/2017 | Mabey | ................. | G06F 3/0483 |
| 2017/0195411 A1 * | 7/2017 | Mabey | ................. | H04L 65/4015 |
| 2018/0018085 A1 * | 1/2018 | Watanabe | ............. | G06F 3/0488 |
| 2018/0046345 A1 * | 2/2018 | Elhard | .................... | G06F 3/038 |
| 2018/0052534 A1 * | 2/2018 | Ron | ..................... | G06F 3/03545 |
| 2018/0074775 A1 * | 3/2018 | Mabey | ................ | H04L 67/1044 |
| 2018/0203566 A1 * | 7/2018 | Kawasaki | ........ | G06F 3/0488 |
| 2018/0225037 A1 * | 8/2018 | Tran | ................... | G06F 3/04883 |
| 2018/0234295 A1 * | 8/2018 | Koyama | ................ | H04L 12/1818 |
| 2018/0275830 A1 * | 9/2018 | Christiansson | ....... | G06F 3/0421 |
| 2018/0348896 A1 * | 12/2018 | Markiewicz | ........ | G06F 3/04847 |
| 2019/0005616 A1 * | 1/2019 | de la Fuente | ........... | G06T 3/403 |
| 2019/0026063 A1 * | 1/2019 | Mabey | ..................... | G06F 3/017 |
| 2019/0033991 A1 * | 1/2019 | Shirai | ................... | G06F 3/0383 |

* cited by examiner (a)
| Time | P1 | | P2 | | P3 | | P4 | | P5 | | P6 | |
|---|---|---|---|---|---|---|---|---|---|---|---|---|
| t | x | y | x | y | x | y | x | y | x | y | x | y |
| 1 | 11.59 | 8.28 | 13.09 | 1.98 | 7.36 | 8.61 | 17.36 | 6.11 | 12.36 | 12.11 | 15.36 | 10.15 |
| 2 | 11.39 | 8.08 | 12.86 | 1.90 | 7.20 | 8.48 | 17.12 | 5.92 | 12.12 | 11.92 | 15.12 | 9.91 |
| 3 | 11.09 | 7.78 | 12.70 | 1.88 | 6.93 | 8.25 | 16.93 | 5.75 | 11.93 | 11.75 | 14.93 | 9.74 |
| 4 | 10.89 | 7.58 | 12.49 | 1.82 | 6.71 | 8.03 | 16.71 | 5.53 | 11.71 | 11.53 | 14.71 | 9.52 |
| 5 | 10.49 | 7.08 | 12.23 | 1.71 | 6.29 | 7.58 | 16.29 | 5.08 | 11.29 | 11.08 | 14.29 | 9.00 |
| 6 | 10.19 | 6.78 | 12.08 | 1.60 | 6.00 | 7.25 | 16.00 | 4.75 | 11.00 | 10.75 | 14.00 | 8.76 |
| 7 | 9.79 | 6.28 | 11.76 | 1.50 | 5.57 | 6.75 | 15.57 | 4.25 | 10.57 | 10.25 | 13.57 | 8.24 |
| 8 | 8.89 | 5.28 | 11.28 | 1.42 | 4.68 | 5.67 | 14.68 | 3.17 | 9.68 | 9.17 | 12.68 | 7.17 |
| 9 | 8.69 | 4.98 | 10.28 | 1.31 | 4.41 | 5.33 | 14.41 | 2.83 | 9.41 | 8.83 | 12.41 | 6.83 |
| 10 | 8.39 | 4.68 | 10.00 | 1.28 | 4.13 | 4.98 | 14.13 | 2.48 | 9.13 | 8.48 | 12.13 | 6.49 |

(b)
| t | P3-P1 | P1-P5 | P5-P2 | P2-P6 | P6-P4 | P5-P6 |
|---|---|---|---|---|---|---|
| 1 | 4.24 | 3.90 | 10.15 | 8.48 | 4.51 | 3.58 |
| 2 | 4.21 | 3.91 | 10.05 | 8.32 | 4.46 | 3.61 |
| 3 | 4.18 | 4.06 | 9.90 | 8.17 | 4.46 | 3.61 |
| 4 | 4.20 | 4.04 | 9.74 | 8.01 | 4.46 | 3.61 |
| 5 | 4.23 | 4.08 | 9.42 | 7.58 | 4.40 | 3.65 |
| 6 | 4.21 | 4.06 | 9.22 | 7.41 | 4.48 | 3.60 |
| 7 | 4.24 | 4.04 | 8.83 | 6.98 | 4.47 | 3.61 |
| 8 | 4.22 | 3.97 | 7.91 | 5.92 | 4.47 | 3.61 |
| 9 | 4.29 | 3.91 | 7.57 | 5.92 | 4.47 | 3.60 |
| 10 | 4.27 | 3.88 | 7.26 | 5.63 | 4.48 | 3.60 |
| max | 4.29 | 4.08 | 10.15 | 8.48 | 4.51 | 3.65 |
| min | 4.18 | 3.88 | 7.26 | 5.63 | 4.40 | 3.58 |
| Δmax | 0.11 | 0.20 | 2.89 | 2.85 | 0.11 | 0.07 |

(c)

(a)

| Time | P1 | | P3 | | P4 | | P5 | | P6 | |
|---|---|---|---|---|---|---|---|---|---|---|
| t | x | y | x | y | x | y | x | y | x | y |
| 1 | 11.59 | 8.28 | 7.36 | 8.61 | 17.36 | 6.11 | 12.36 | 12.11 | 15.36 | 10.15 |
| 2 | 11.39 | 8.08 | 6.86 | 8.48 | 17.12 | 5.92 | 12.12 | 11.92 | 15.12 | 9.91 |
| 3 | 11.09 | 7.78 | 6.06 | 8.25 | 16.93 | 5.75 | 11.93 | 11.75 | 14.93 | 9.74 |
| 4 | 10.89 | 7.58 | 5.06 | 8.03 | 16.71 | 5.53 | 11.71 | 11.53 | 14.71 | 9.52 |
| 5 | 10.49 | 7.08 | 4.26 | 7.58 | 16.29 | 5.08 | 11.29 | 11.08 | 14.29 | 9.00 |
| 6 | 10.19 | 6.78 | 3.46 | 7.25 | 16.00 | 4.75 | 11.00 | 10.75 | 14.00 | 8.76 |
| 7 | 9.79 | 6.28 | 2.66 | 6.75 | 15.57 | 4.25 | 10.57 | 10.25 | 13.57 | 8.24 |
| 8 | 8.89 | 5.28 | 1.86 | 5.67 | 14.68 | 3.17 | 9.68 | 9.17 | 12.68 | 7.17 |
| 9 | 8.69 | 4.98 | 1.06 | 5.33 | 14.41 | 2.83 | 9.41 | 8.83 | 12.41 | 6.83 |
| 10 | 8.39 | 4.68 | 0.26 | 4.98 | 14.13 | 2.48 | 9.13 | 8.48 | 12.13 | 6.49 |

(b)

| t | P1-P2 | P1-P4 | P4-P5 | P5-P3 |
|---|---|---|---|---|
| 1 | 4.24 | 3.90 | 3.58 | 4.51 |
| 2 | 4.55 | 3.91 | 3.61 | 4.46 |
| 3 | 5.05 | 4.06 | 3.61 | 4.46 |
| 4 | 5.85 | 4.04 | 3.61 | 4.46 |
| 5 | 6.25 | 4.08 | 3.65 | 4.40 |
| 6 | 6.75 | 4.06 | 3.60 | 4.48 |
| 7 | 7.15 | 4.04 | 3.61 | 4.47 |
| 8 | 7.04 | 3.97 | 3.61 | 4.47 |
| 9 | 7.64 | 3.91 | 3.60 | 4.47 |
| 10 | 8.14 | 3.88 | 3.60 | 4.48 |
| max | 8.14 | 4.08 | 3.65 | 4.51 |
| min | 4.24 | 3.88 | 3.58 | 4.40 |
| Δmax | 3.89 | 0.20 | 0.07 | 0.11 |

(c)

ERASER DEVICE AND COMMAND INPUT SYSTEM

BACKGROUND OF THE INVENTION

Field of the Invention

The present invention relates to an eraser device for performing an erase-operation onto a touch panel to erase a display image, and a command input system including the eraser device and the touch panel.

Description of the Related Art

Conventionally, as a method of erasing an image displayed on a display screen via a touch panel according to a user's touch operation, a method was known in which the touch operation for an erase-operation was next operated after any special operation, namely, a mode switching operation (a picture mode and an eraser mode are switched to each other) was preliminarily operated indicating that a forthcoming touch operation was to erase the image, and, then, the touch operation for erasing was made.

However, in this method, it was necessary to perform the erase-operation after the mode switching operation was made, so that a problem was that a two-step operation was needed and troublesome.

On the other hand, in Patent Document 1, there is disclosed a technique of performing a touch operation with use of a special input instrument for an erase-operation (eraser device) for erasing, thereby causing a touch panel to recognize an erase command.

Concretely, in Patent Document 1, there is disclosed a technique that two coordinate-indicating parts comprised of a push button are provided on both ends of a diagonal line of a rectangular eraser device (input instrument special for erasing) for inputting an erase command of an image displayed on a display screen. The eraser device is communicatively connected with a touch panel (a data processing device) by wire. When the eraser device is pressed to the touch panel, so that the push button is pushed, the touch panel is caused to recognize an erase command.

RELATED ART

Patent Document

Patent Document 1: Japanese Unexamined Patent Application Publication No. HEI08(1996)-263212 (published on Oct. 11, 1996).

SUMMARY OF THE INVENTION

Problems that the Invention is to Solve

However, the technique disclosed in Patent Document 1 had the problem that it was necessary to provide both an eraser device and a touch panel with a communicating function, so that a cost of such device was increased.

To solve these problems, it is an object of the present invention to inexpensively provide an improved eraser device for easily performing an erase-operation of an image displayed on a touch panel, and a command input system including the eraser device and the touch panel.

Means of Solving the Problems

According to an aspect of the present invention, an eraser device for inputting an erase-operation of a display image to a touch panel, the touch panel includes an input point detection unit for detecting, as input points based on a plurality of detection points arranged on or near to a display screen, detecting points where a touch operation is performed; and an erase-operation determination unit for determining whether or not a user's operation is the erase-operation, according to a degree of density of the input points, wherein the eraser device includes a plurality of touch parts to be detected as the input points when brought into contact with or closer to the touch panel, and the plurality of touch parts are formed at such a degree of density that it is determined by the erase-operation determination unit that the erase-operation is being performed.

Effect of the Invention

According to the above configuration, by performing the user's touch operation on the display screen of the touch panel using the eraser device, it is possible to cause the touch panel to detect each of the touch parts of the eraser device as the input points, and cause the touch parts to be at such a degree of density that it is determined that the erase-operation is being performed. Accordingly, even if information indicative of an erase command is not transmitted from the eraser device to the touch panel, it is possible to cause the touch panel to recognize the erase-operation. Therefore, it is unnecessary to provide both the eraser device and the touch panel with any communicating function, so that a manufacturing cost of the eraser device and the touch panel can be reduced. Further, a mode switching operation to switch a picture mode and an erasure mode to each other is not made, it is possible to cause the touch panel to recognize the erase-operation, so that user's convenience can be increased. Hence, according to the present invention, an improved command input system for easily performing the erase-operation to the touch panel can be provided, inexpensively.

BEST MODE FOR CARRYING OUT THE INVENTION

First Embodiment

A first embodiment of the present invention will be described below.

1-1, Overall Configuration of Touch Panel

Figure 1:
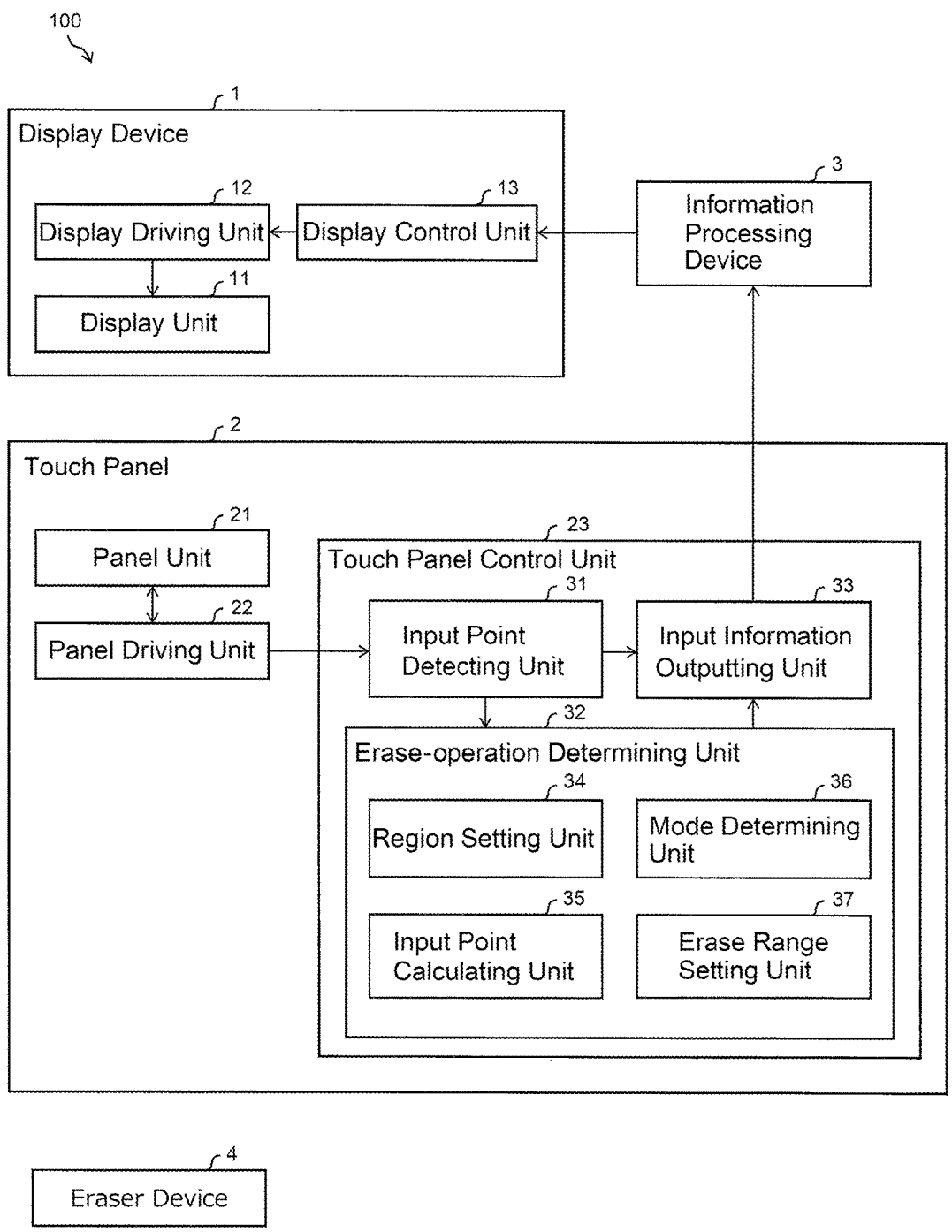
FIG. 1 is an overall configuration diagram showing a command input system according to a first embodiment of the present invention.

FIG. 1 is an overall configuration diagram showing a command input system 100 according to a first embodiment of the present invention. As shown in FIG. 1, the command input system 100 includes a display device 1, a touch panel 2, an information processing device 3, and an eraser device 4.

The information processing device 3 outputs image data to be displayed to the display device 1, and acquires from the touch panel 2, information according to user's touch operation (operation input) to the display screen of the image data displayed. Further, the information processing device 3 renews the image data to be output to the display device 1 on the basis of the information corresponding to the user's touch operation derived from the touch panel 2, or performs any other operation according to the user's touch operation. Besides, the configuration of the information processing device 3 should not be limited thereto, and it may be a personal computer.

The display device 1 includes a display unit 11, a display driving unit 12 and a display control unit 13.

The display unit 11 is provided for displaying an image corresponding to the image data acquired from the information processing device 3 in the display screen. For example, it may be a liquid crystal display, an organic EL (electroluminescence) display, a plasma display, a projector, or the like. The resolution and the largeness of the display unit 11 should not be limitative, and, for example, it may be a full high definition television size of 1920 pixels×1080 pixels, or 4K size of 3840 pixels×2160 pixels.

The display driving unit 12 is responsive to the instructions from the display control unit 13 for driving the pixels of the display unit 11.

The display control unit 13 is responsive to the image data to be displayed for controlling the operation of the display driving unit 12, so that the display unit 11 displays an image corresponding to the image data to be displayed.

The touch panel 2 includes a panel unit 21, a panel driving unit 22 and a touch panel control unit 23.

Figure 2:
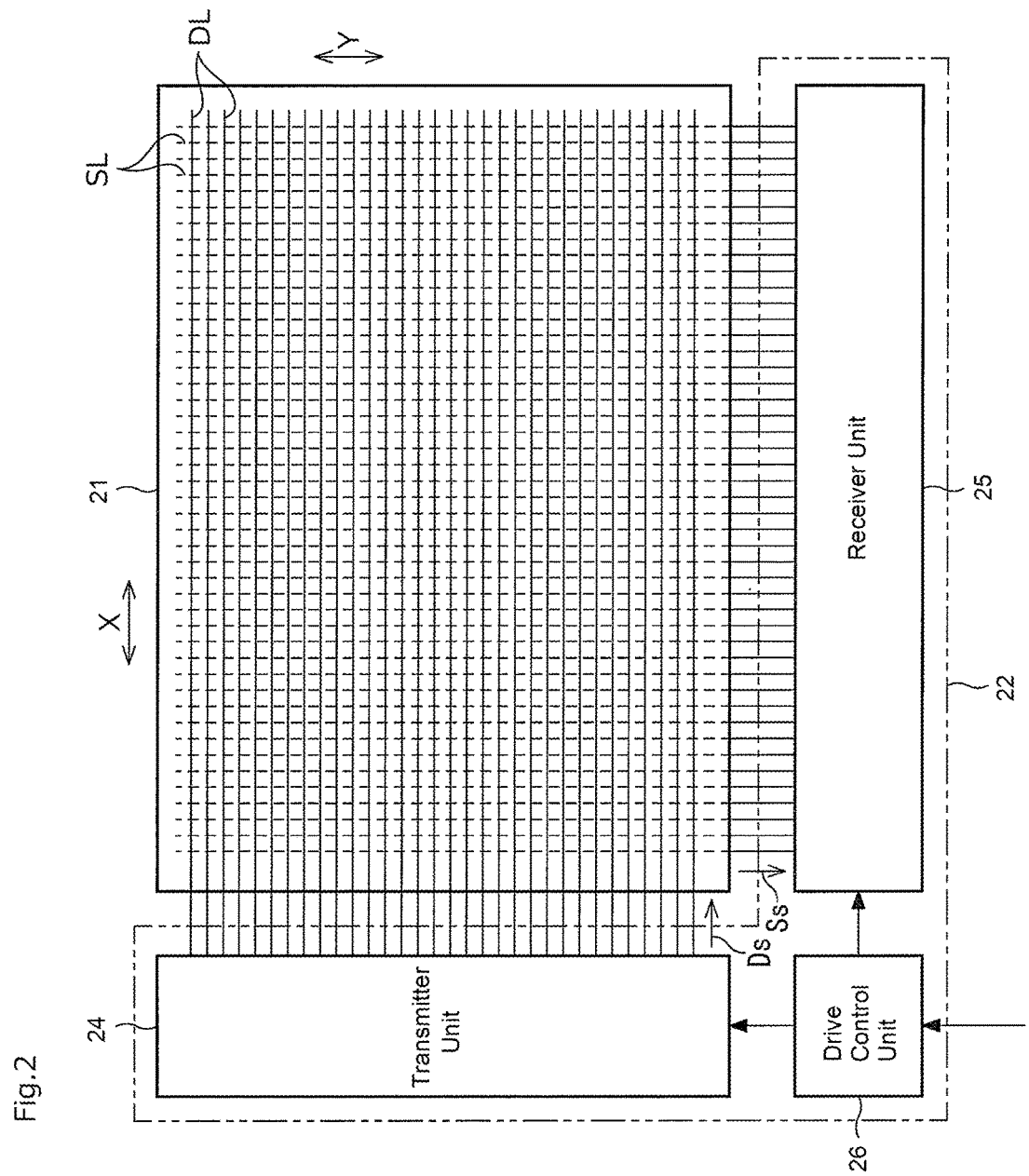
FIG. 2 is a diagram showing a configuration of a panel unit and a panel driving unit in a touch panel provided with the command input system of FIG. 1.

FIG. 2 is a diagram showing a configuration of the panel unit 21 and the panel driving unit 22.

The panel unit 21 is overlaid on the display screen of the display device 1, so that signals corresponding to user's instruction inputs to the image displayed on the display unit 11 are output to the panel driving unit 22.

As shown in FIG. 2, the panel unit 21 has a plurality of drive lines DL arranged in parallel to each other, and a plurality of sense lines SL arranged in parallel to each other. The drive lines DL are extended in the x direction (the lateral direction of the paper face), and the sense lines SL are extended in the y direction (the longitudinal direction of the paper face) which is perpendicular to the x direction. The drive lines DL and the sense lines SL are arranged (in a matrix), so that both are crossed in a 3-dimensional form.

The number of each of the drive lines DL and the sense lines SL should not be limitative, and according to this embodiment of the present invention, the number of the drive lines DL is 4096 and the number of the sense lines SL is 2160, so that the variation of a capacitance is detected at each of the coordinate points of 4096×2160. The configuration of the panel unit 21 should not be limited to the above, and, it may be various type of panel units used in the touch panel of the capacitive type.

The panel driving unit 22 includes a transmitter unit 24, a receiver unit 25 and a drive control unit 26. The drive control unit 26 is provided for controlling operation timings of the transmitter unit 24 and the receiver unit 25. The transmitter unit 24 is provided for applying drive signals Ds at a timing corresponding to a predetermined frame rate to the drive lines DL at a timing instructed from the drive control unit 26, respectively. The receiver unit 25 is provided for acquiring sense signals Ss at a timing synchronized with the applied drive signals Ds on the drive lines DL. The sense signals Ss are response signals generated on the sense lines SL corresponding to the application of the applied drive signals Ds on the drive lines DL.

When a conductive object (e.g. a finger of the user, a pen peculiar to the touch panel, or an eraser device 4) is close to the panel unit 21, the capacitance at the crossing points (detection points) of the drive lines DL and the sense lines SL is varied. The receiver unit 25 outputs to the touch panel control unit 23 (input point detecting unit 31), first signals corresponding to the capacitance at the crossing points of the drive lines DL and the sense lines SL, and second signals indicating the crossing points.

The touch panel control unit 23 includes the input point detecting unit 31, an erase-operation determining unit 32 and an input information outputting unit 33.

On the basis of the first signals corresponding to the capacitance at the crossing points of the drive lines DL and the sense lines SL, and the second signals indicating the crossing points, both acquired from the panel driving unit 22, the input point detecting unit 31 detects so that the crossing point, at which the capacitance is different by a predetermined value or more from the other crossing points, is detected as a touch operation point (input point), on which a touch operation to the panel unit 21 is performed by the user. Besides, in this embodiment of the present invention, the detection of the touch operations corresponding to one display screen is treated as one frame process, so that the process covering each frame is carried out at a predetermined cycle and the touch operation point is detected at each frame (e.g. each 5 mm). Accordingly, the movement of the touch operation points across the continuous frames can be detected at each frame.

An erase-operation determining unit 32 includes a region setting unit 34, an input point calculating unit 35, a mode determining unit 36 and an erase range setting unit 37. The erase-operation determining unit 32 determines whether or not the user's touch operation is an erase-operation (i.e. the operation for erasing the image displayed on the display unit 11 within a region according to the touch operations) on the basis of the input points detected by the input point detecting unit 31. If it is detected that the user's touch operation is the erase-operation, the erase-operation determining unit 32 sets an erase range according to the user's touch operations. The details of these processes in the erase-operation determining unit 32 will be described below.

The input information outputting unit 33 outputs the user's touch operation detected by the input point detecting unit 31, and the information determined by the erase-operation determining unit 32 to the information processing device 3.

More particularly, if the erase-operation determining unit 32 determines that it is the touch operation by the user, the information that it is the touch operation, and the information indicating the erase range are output to the information processing device 3. Further, if the erase-operation determining unit 32 determines that it is not the touch operation, the information that it is not the touch operation, and the information indicating the touch operation point by the user are output to the information processing device 3. Otherwise, if the erase-operation determining unit 32 determines that it is the touch operation by the user, the information (area information) indicating the erase range may be output. Further, if the erase-operation determining unit 32 determines that it is not the touch operation, position information (point information) of the input point corresponding to the touch operation may be output. In such a case, the information processing device 3 may determine whether or not it is the erase-operation depending on receiving the information (area information) indicating the erase range or the position information (point information) of the input point. The user's operations other than the erase-operation are picture instructions of inputting lines, points, characters, drawings or the like, or optional instructions of selecting a desired item from a menu displayed in the display unit 11.

Thereby, the information processing device 3 varies the image displayed on the display unit 11 according to the user's touch operation and performs various processes according to the user's touch operation.

If it is determined that the user's touch operation is the erase-operation, for example, the information processing device 3 erases the image included within the erase range. Besides, if it is detected that the user's touch operation is the erase-operation, the information processing device 3 may display an image indicating the shape of the erase range (such as a frame image) at a position corresponding to the user's touch operation.

If it is determined that the user's touch operation is not the erase-operation, and the point of the user's touch operation is a position corresponding to the menu selection image display, the information processing device 3 performs the menu selection process corresponding to the touch operation. If it is determined that the user's touch operation is not the erase-operation, and the point of the touch operation is a picture region, the information processing device 3 performs the picture process. For example, in the picture process, a picture is drawn by connecting coordinates of the touch operations detected at each frame with lines or curves.

Figure 3:
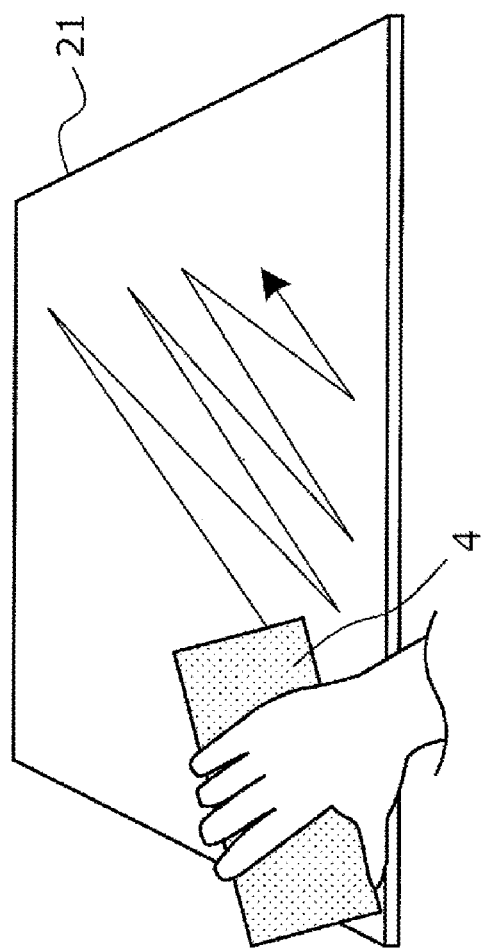
FIG. 3 is a diagram showing a way of an erase-operation to the command input system of FIG. 1.

The eraser device is an input device for performing an erase-operation by the user to the touch panel 2. In this embodiment of the present invention, as shown in FIG. 3, the erase-operation is being made while the user handles the eraser device 4 and moves it while brought into contact with or closer to the panel unit 21. The configuration of the eraser device will be described below.

1-2, Configuration of Eraser Device 4

Figure 4:
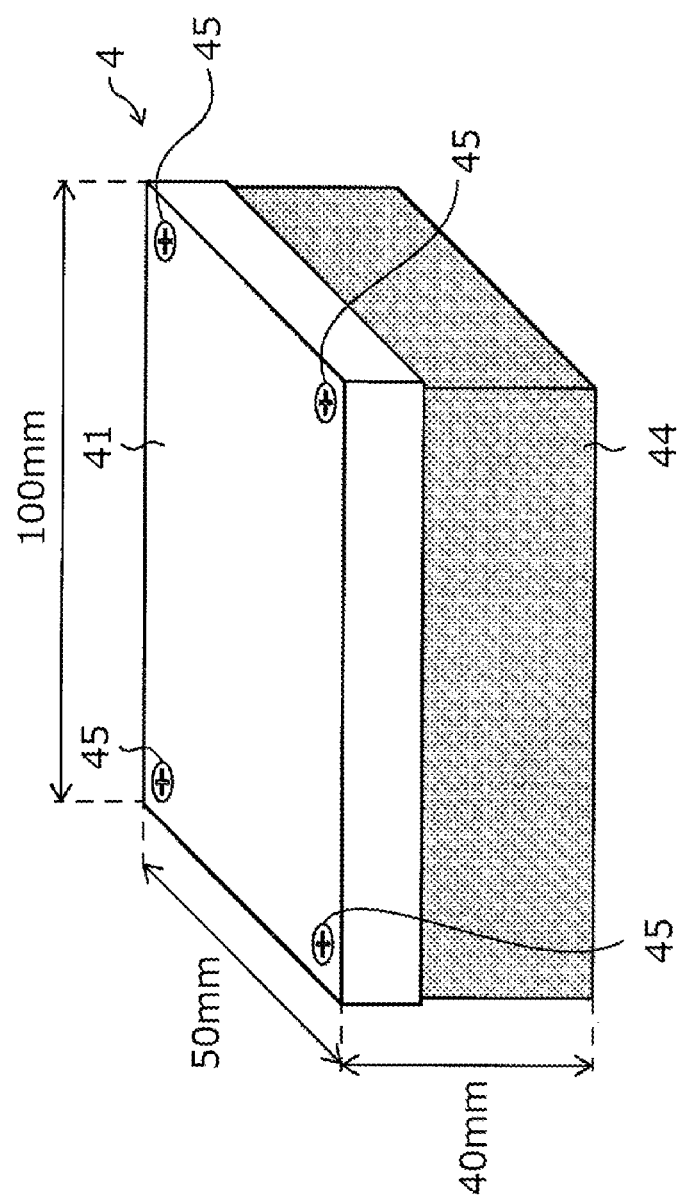
FIG. 4 is a perspective view showing an outside of the eraser device provided with the command input system of FIG. 1.

FIG. 4 is a perspective view showing an outside of the eraser device 4. FIG. 5(a) is a top view of the eraser device, FIG. 5(b) is a cross sectional view taken on line A-A of FIG. 5(a), FIG. 5(c) is a cross sectional view taken on line B-B of FIG. 5(a), and FIG. 5(d) is a cross sectional view taken on line C-C of FIG. 5(b). FIG. 6 is an exploded sectional view of the eraser device 4. FIG. 7 is a cross sectional view of a conductive buffer material 46 provided with the eraser device 4.

Figure 5:
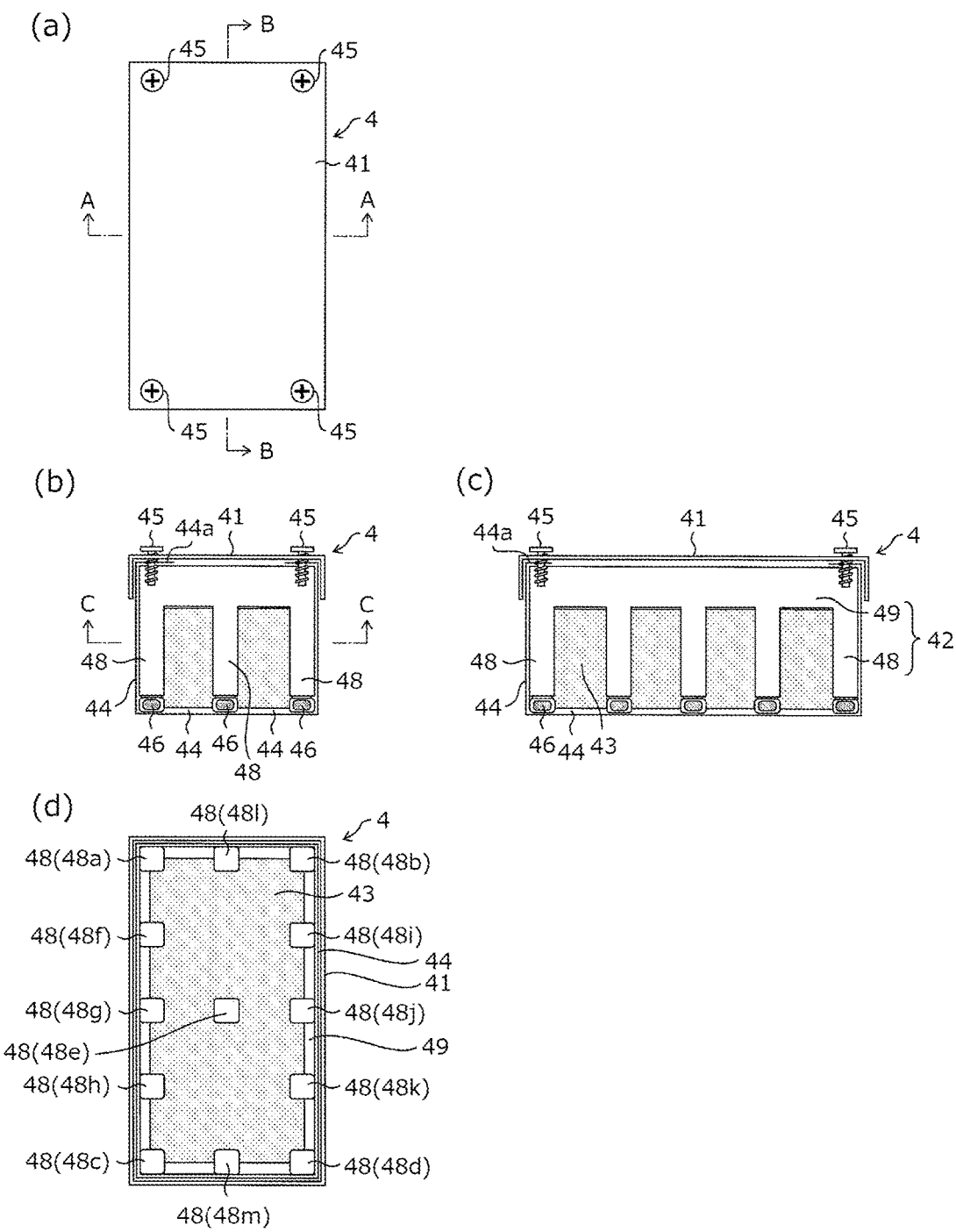
FIG. 5(a) is a top view of the eraser device.
FIG. 5(b) is a cross sectional view taken on line A-A of FIG. 5(a)
FIG. 5(c) is a cross sectional view taken on line B-B of FIG. 5(a)
FIG. 5(d) is a cross sectional view taken on line C-C of FIG. 5(b)
Figure 6:
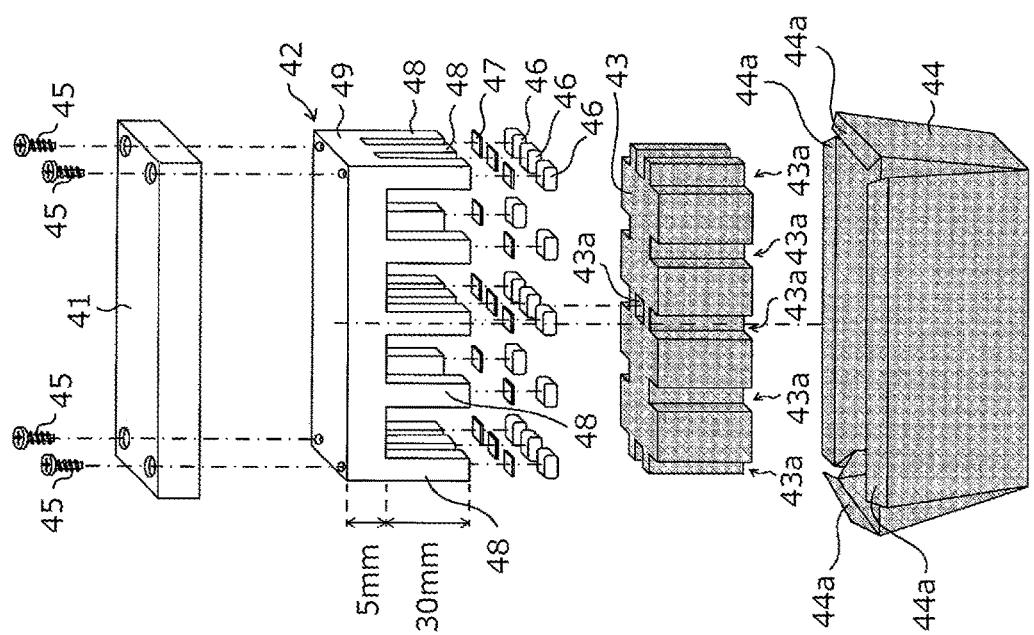
FIG. 6 is an exploded sectional view of the eraser device as shown in FIG. 4.
Figure 7:
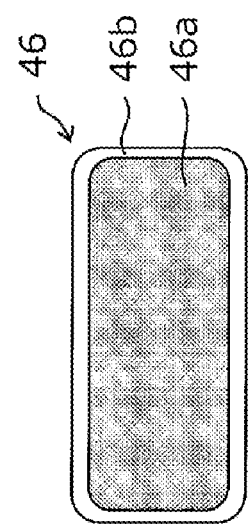
FIG. 7 is a cross sectional view of a conductive buffer material provided with the eraser device of FIG. 4.

As shown in FIGS. 4-6, the eraser device 4 is provided with a grip part 41, a body part 42, a pillar protection part 43, a cloth part 44, screws 45, and the conductive buffer material 46. In this embodiment of the present invention, as shown in FIG. 4, the eraser device 4 is shaped as a rectangular parallelepiped of 100 m in length, 50 mm in width, and 40 mm in height.

The grip part 41 is made of a conductive material such as metal and conductive resin so as to cover the top surface of the eraser device 4, and ends of the top side at the respective sides of the eraser device 4. In this embodiment of the present invention, a plate material made of conductive resin of 3 mm in thickness is used for the grip part 41.

The body part 42 is made of a conductive material such as metal and conductive resin, and is provided with a base part 49 of a rectangular shape, and 13 pillar parts 48 (first to thirteenth pillar parts 48a to 48m) which protrude in a predetermined direction from the base part 49. More particularly, each of the pillar parts 48 protrudes from the base part 49 to a bottom side of the eraser device 4 (the side of the touch panel 2), namely, an approximately perpendicular direction with respect to the confronting side of the grip part 41 with the base part 49 (in the case of FIG. 6, the confronting side of the grip part 41 with the base part 49 is a flat). When the eraser device 4 performs a touch operation to the panel unit 21, each of the pillar parts 48 may be arranged to be an approximately perpendicular direction with respect to the panel unit 21. In this embodiment of the present invention, as shown in FIG. 6, a thickness of the base part 49 is 5 mm, and a length of each of the pillar parts 48 is 30 mm. Further, a cross sectional shape of each of the pillar parts 48 is a square shape of 8 mm at one side.

In this embodiment of the present invention, as shown in FIG. 5(d), among 13 pillar parts 48 (the first pillar part 48a to the thirteenth pillar part 48m), the first pillar part 48a to a fourth pillar part 48d are arranged at four corners of the base part 49 of the rectangular shape when viewed from the bottom side of the eraser device 4; a fifth pillar part 48e is arranged at a central part of the base part 49 (at a position corresponding to a crossing point or adjacent to the crossing point of diagonal lines of the rectangular shape); a sixth pillar part 48f to an eighth pillar part 48h are arranged on one long side of the rectangular shape; a ninth pillar part 48i to an eleventh pillar part 48k are arranged on another long side of the rectangular shape; a twelfth pillar part 48l is aligned on one short side of the rectangular shape; and the thirteenth pillar part 48m is aligned on another short side of the rectangular shape.

Although, in this embodiment of the present invention, the pillar parts 48 are used whose cross-sectional shape is a rectangle, the shape of the pillar parts 48 should not be limited to this. For example, its cross-sectional shape may be a circle, ellipse, polygon, or a shape of chamfering off the corners of the polygon. In addition, the number of the pillar parts 48 should not be limited to 13.

The conductive buffer material 46 is adhered to the pillar parts 48 by a conductive adhesive material 47 so as to be electrically conducted with the pillar parts 48 at the tip of each of the pillar parts 48 in a predetermined direction (the edge at the bottom side of the eraser device 4). As far as the conductive adhesive material 47 is electrically conductive adhesive, the material thereof should not be limited. For example, it may be conductive acrylic adhesive or a conductive non-woven both-sided tape.

FIG. 7 is a cross sectional view of the conductive buffer material 46. As shown in FIG. 7, the conductive buffer material 46 is structured so that a surrounding of its buffer material 46a is covered with a conductive membrane 46b. As far as a material of the buffer material 46a is an elastic material, properly, it should not be limited. For example, a foaming material such as polyurethane foam may be used. Further, as far as a material of the conductive membrane 46b is conductive and flexible following deformation of the buffer material 46a, it should not be limited. For example, it may be a membrane in which a conductive material such as copper or nickel is included into resin such as polyimide to provide conductivity, or a conductive membrane in which a conductive layer made of copper and nickel is formed on a surface of resin such as polyimide.

The pillar protection part 43 is made of a nonconductive and elastic material such as polyurethane. It is arranged at a region between the respective pillar parts 48 so as to occupy a gap between them. More particularly, the pillar protection part 43 is formed with concavities 43a corresponding to the shape of the pillar parts 48 at the positions of the pillar parts 48. Each of the pillar parts 48 corresponding to the concavities 43a is inserted to each of the concavities 43a, so that the pillar protection part 43 is arranged at the region between the respective pillar parts 48. As the pillar protection part 43 is thus arranged at the region between the respective pillar parts 48, outer force served to the respective pillar parts 48 can be reduced, so that the respective pillar parts 48 can be prevented from being broken or deformed.

The cloth part 44 is made of a thin and nonconductive cloth material such as felt to cover the bottom face of the eraser device 4, and bottom side portions at the respective sides of the eraser device 4. More particularly, as shown in FIG. 6, the cloth part 44 is provided with portions arranged on the bottom face and the sides of the body part 42 in the eraser device 4, and with edges 44a folded from upper edges of the sides of the body part 42 along the top face of the body part 42. As the edges 44a are sandwiched between the top face of body part 42 and the grip part 41, the cloth part 44 is arranged to cover the bottom face of the body part 42 (the tip sides of the pillar parts 48) and the respective sides of the body part 42. A thickness of cloth part 44 is set to be such a thickness that a change in capacitor of each of the pillar parts 48 can be detected by the touch panel 2 when the user handles the eraser device 4 and brings the bottom face of the eraser device 4 (the faces of the tip sides of the pillar parts 48) into contact closer to or with the panel unit 21 of the touch panel 2. In this embodiment of the present invention, the thickness of the cloth part 44 may be 1 mm.

The screws 45 are made of a conductive material such as metal and conductive resin. Under the condition that the screws 45 sandwich edges 44a of the cloth part 44 between the grip part 41 and the body part 42, they fix the grip part 41 and the body part 42. Thereby, the grip part 41, the body part 42 and the conductive buffer material 46 are electrically conducted with the user who handles the grip part 41. Although, in this embodiment of the present invention, the grip part 41 and the body part 42 are fixed with the conductive screws 45, they should not be limited. For example, they may be fixed with conductive adhesive material (e.g. conductive glue or conductive both-sided tape or the like). Otherwise, the grip part 41 and the body part 42 may be fixed by engaging an engagement portion of the grip part 41 with an engagement receptor portion of the body part 42.

1-3, Detection Process of Instruction Input By Touch Operation

Figure 8:
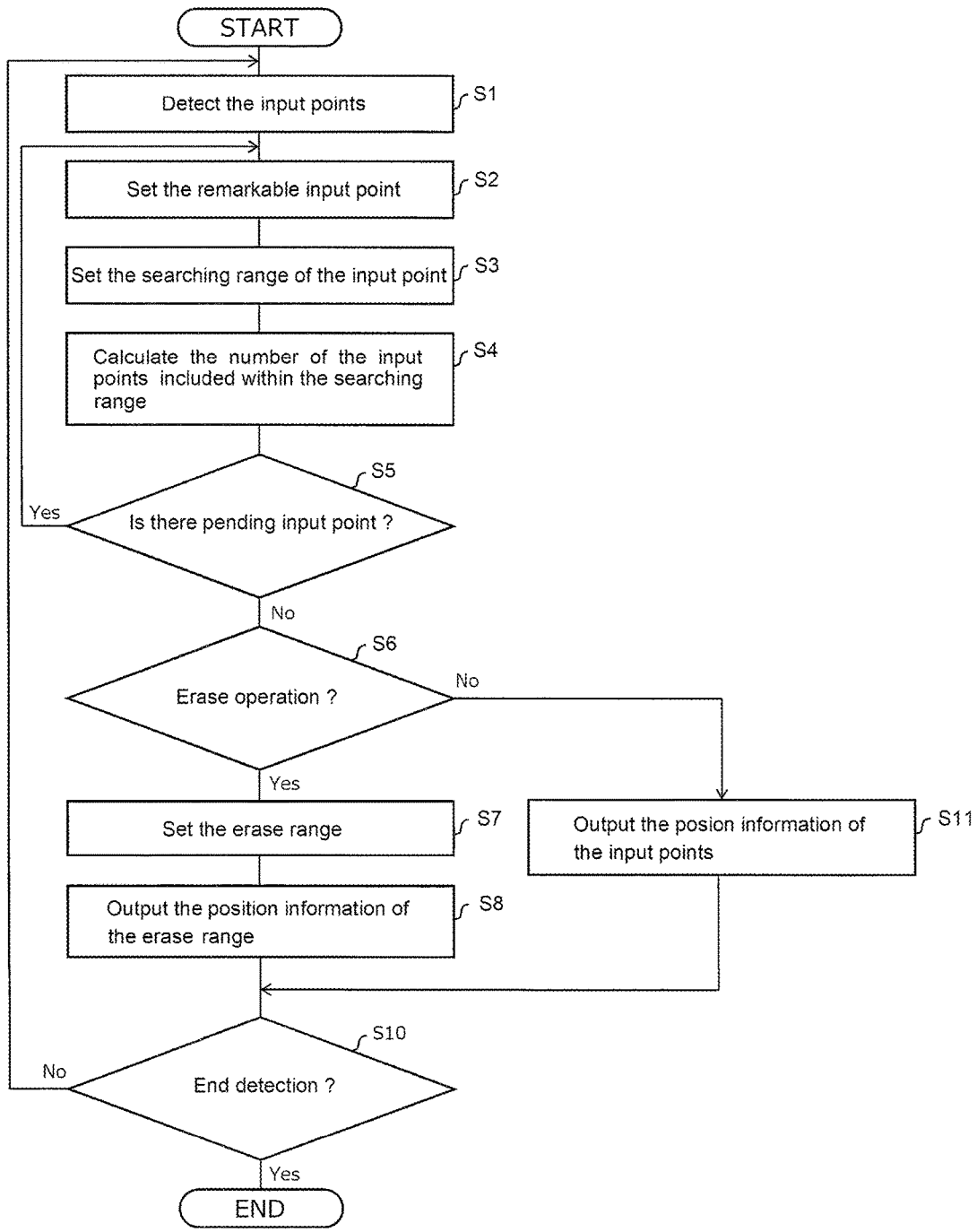
FIG. 8 is a flow chart showing a routine of detection process of command inputs by the user to the touch panel provided with the command input system of FIG. 1.

FIG. 8 is a flow chart showing a routine of detection process of an instruction input by the user in the touch panel 2.

At first, the input point detected by the input point detecting unit 31 is inputted from the panel driving unit 22. On the basis of the signal indicating the capacitance at the crossing point (detection point) of the drive line DL and the sense line SL, the input point (the user's touch operation point) is detected (S1). For example, the input point detecting unit 31 detects the crossing point, at which the capacitance is different by a predetermined value or more from the other crossing points (or a predetermined reference value), as the input point.

Figure 9:
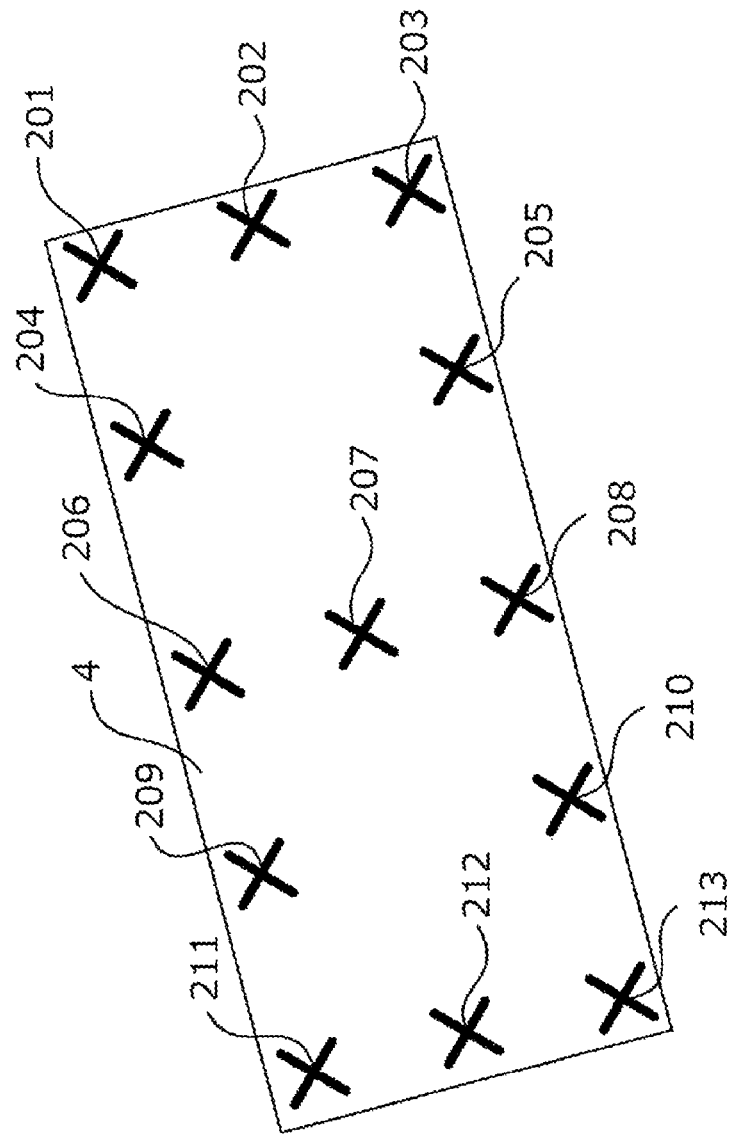
FIG. 9 is a diagram showing input points detected when the eraser device makes a touch operation toward touch parts of the touch panel with the command input system of FIG. 1.

In addition, for example, as shown in FIG. 3, when the eraser device 4 performs the touch operation to the panel unit 21, a plurality of detection points (e.g. the input points 201-213 shown in marks x in FIG. 9) corresponding to positions in which each of the pillar parts 48 of the eraser device 4 is contact with or closer to the panel unit 21 through the conductive buffer material 46 and the cloth part 44 are detected as the input points by the touch panel 2.

Next, the region setting unit 34 sets one of the input points detected at S1 as a remarkable input point (S2), and sets a predetermined region centering the remarkable input point as a searching range (S3).

Figure 10:
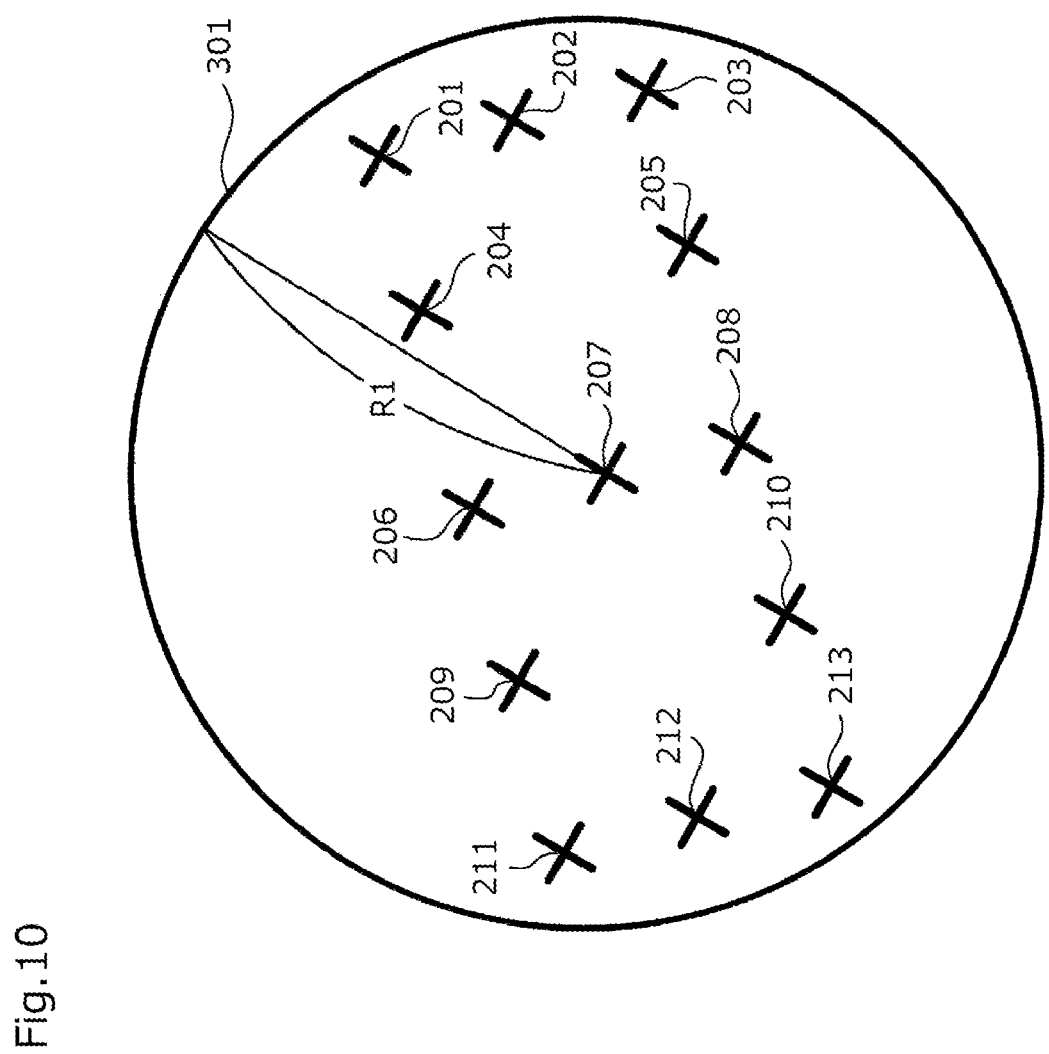
FIG. 10 is a diagram showing a routine of determination process for determining whether or not the user's operation is an erase-operation on the basis of the input points by the user as shown in FIG. 9.

More particularly, as shown in FIG. 10, the region setting unit 34 sets, as the searching range, a circle 301 of a radius R1 (R1 is 70 mm in this embodiment) centering the remarkable input point (input point 207 in the example of FIG. 10). The size of the radius R1 should not be limited to 70 mm, and it may be optioned depending on the largeness of the eraser device 4. For example, the value of the radius R1 may be a radius of a circle for including the pillar parts 48 (the first pillar part 48a to the thirteenth pillar part 48m) when the fifth pillar part 48e centered in the eraser device 4 is the remarkable input point.

Then, the input point calculating unit 35 calculates the number of the input points included within the searching range set in S3 (S4). For example, in the example of FIG. 10, 13 input points of 201-213 are calculated.

Next, the region setting unit 34 determines whether or not a pending input point remains which has not been processed with the processes of S2-S4 as the remarkable input points defined by the input points among all the input points detected in S1 (S5). If the pending input points remain, the processes of S2-S4 are performed as the remarkable input point on the basis of one of the pending input points.

Otherwise, if it is determined that no pending input point remains in S5, the mode determining unit 36 determines whether or not the user's touch operation is the erase-operation (whether or not the eraser device 4 performs the touch operation) according to the calculating result of the input points in S4 (S6). That is, the mode determining unit 36 determines whether or not the user's touch operation is the erase-operation according to the degree of density of the input points.

More particularly, according to this embodiment of the present invention, the mode determining unit 36 determines that the user's touch operation is the erase-operation only if there is the remarkable input point, in which the number of the input points included in the searching range is a threshold value (e.g. 13) or more. In addition, it determines that the user's touch operation is not the erase-operation only if there is not the remarkable input point.

Otherwise, the mode determining unit 36 may determine that the user's touch operation is the erase-operation only if the remarkable input point, in which the number of the input points included in the searching range is a first number N1 (e.g. 3) or more, has a number of a predetermined threshold value (e.g. 13) or more. In addition, it may determine that the user's touch operation is not the erase-operation only if the remarkable input point, in which the number of the input points included in the searching range is a first number N1 or more, has a number less than a predetermined threshold value.

If the mode determining unit 36 determines that the user's touch operation is the erase-operation in S6, the erase range setting unit 37 sets an erase range on the basis of the input points detected in S1 (S7).

Figure 11:
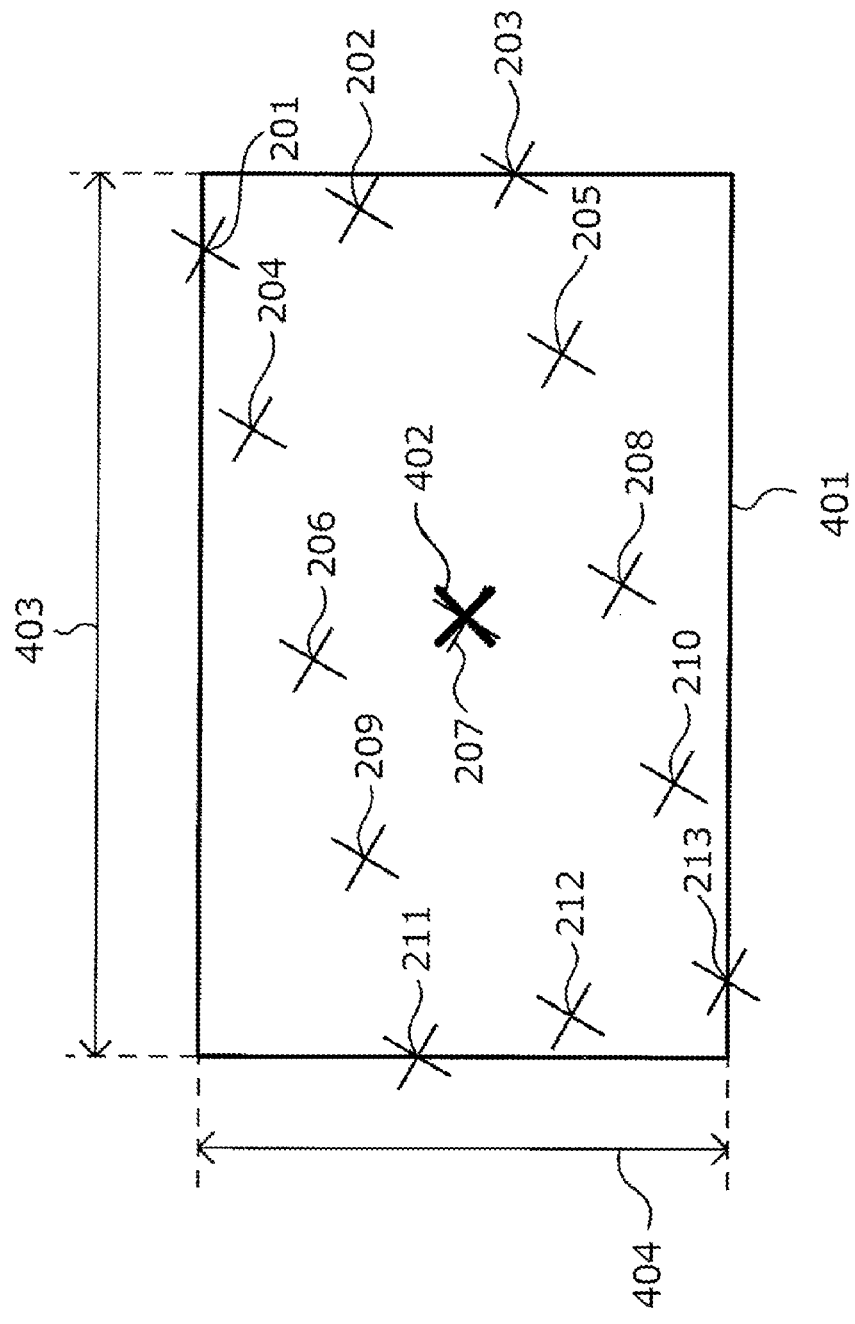
FIG. 11 is a diagram showing a routine of set process for setting an erase range on the basis of the input points by the user as shown in FIG. 9.

According to this embodiment of the present invention, on the basis of the coordinate values of the input points decided in S1, the maximum of the x coordinate value, the minimum of the x coordinate value, the maximum of the y coordinate value and the minimum of the y coordinate value are extracted. Accordingly, a rectangular region is set as the erase range defined by the extracted coordinate values (in which the four corners are defined by [the minimum of the x coordinate value, the minimum of the y coordinate value]), [the minimum of the x coordinate value, the maximum of the y coordinate value], [the maximum of the x coordinate value, the minimum of the y coordinate value], and [the maximum of the x coordinate value, the maximum of the y coordinate value]). Thereby, as shown in FIG. 11, a region of a rectangle 401 connoting the input points detected in S1 is set as the erase range. However, the set process of the erase range should not be limited to this. For example, a rectangle region of a closed curve connecting the input points detected in S1 may be set as the erase range.

In addition, the width 403 of the rectangle 401 in the x direction is represented by a difference between the maximum of the x coordinate value and the minimum of the x coordinate value. The width 404 in the y direction is represented by a difference between the maximum of they coordinate value and the minimum of they coordinate value. The coordinate point 402 of FIG. 11 indicates the central coordinate point of the rectangle 401 or the point of the center of balance of the region 402. The coordinate values of the central point of the rectangle 401 can be calculated as ((the minimum of the x coordinate value+the maximum of the x coordinate value)÷2, (the minimum of the y coordinate value+the maximum of the y coordinate value)÷2). The coordinate values of the point of the center of balance of the region 402 can be calculated as the average of the coordinate values of the input points detected in S1.

After the process of S7, the input information outputting unit 33 outputs the information indicating that it is the erase-operation and the information indicating the erase range to the information processing device 3 (S8).

As for the information indicating the erase range, for example, the reference position (e.g. the central point) of the rectangle 401, the width 403 of the rectangle 401 in the x direction and the width 404 of the rectangle 401 in the y direction are output. Otherwise, the maximum of the x coordinate value, the minimum of the x coordinate value, the maximum of the y coordinate value and the minimum of the y coordinate value of the rectangle as the erase range may be output. Alternatively, the coordinate values of the corners of the rectangle as the erase range may be output.

In this embodiment of the present invention, the shape of the erase range is assumed to be a rectangle. Thereby, the information processing device 3 can easily calculate the erase range. However, the shape of the erase range should not be limited thereto, and, for example, it may be a circle or ellipse connoting the input points detected in S1.

When the resolution of the display unit 11 is different from that of the panel unit 21, after the input information outputting unit 33 transfers the information indicating the erase range to the coordinate values of the coordinate system corresponding to the resolution of the display unit 11, the input information outputting unit 33 may output the transferred information to the information processing device 3. Otherwise, the input information outputting unit 33 may output the information indicating the erase range to the information processing device 3 in the form of the coordinate values of the coordinate system corresponding to the resolution of the display unit 11, so that the information processing device 3 may transfer the coordinate values of the coordinate system corresponding to the resolution of the display unit 11, if needed.

After, in S8, the information indicating that it is the erase-operation and the information indicating the erase range are output to the information processing device 3, the touch panel control unit 23 determines whether or not the detection of the touch operation should be ended (S10). If it is not ended, the process of S1 is returned. Determining whether or not the detection of the touch operation should be ended should not be limitative, and, for example, it may be determined whether or not it receives the user's instructions of ending the touch operation, or the user's power switching off instructions. Alternatively, it may be determined whether or not a predetermined time has passed without any touch operation on the panel unit 2. Further, it may be determined whether or not a touch-off operation (the operation that the eraser device 4 is separated from the panel unit 21) is made during the erase-operation.

If in the process S6, it is determined that it is not the erase-operation, the input information outputting unit 33 outputs the position information of the input points detected in S1 to the information processing device 3 (S11). In this case, the information that it is not the erase-operation may be output together with the position information of the input points. When the resolution of the display unit 11 is different from that of the panel unit 21, after the input information outputting unit 33 transfers the information indicating the erase range to the coordinate values of the coordinate system corresponding to the resolution of the display unit 11, the input information outputting unit 33 may output the transferred information to the information processing device 3. Otherwise, the input information outputting unit 33 may output the information indicating the erase range to the information processing device 3 in the form of the coordinate values of the coordinate system corresponding to the resolution of the display unit 11, so that the information processing device 3 may transfer the coordinate values of the coordinate system corresponding to the resolution of the display unit 11, if needed.

When the number of the input points detected in the process of S1 is less than the predetermined threshold value (or, the predetermined value or less which is set to be less than the predetermined threshold value), the processes of S2-S6 may be omitted and the process of S11 may be executed. Accordingly, the calculation process in the case that it is not the erase-operation can be simplified.

After in S9, the position information of the input points is output to the information processing device 3, the touch panel control unit 23 determines whether or not the detection of the touch operation should be ended (S10). If it is not ended, the process of S1 is returned.

As described above, according to this embodiment of the present invention, the eraser device 4 includes a plurality of pillar parts 48 (the touch parts) that are detected as the input points when brought into contact with or closer to the panel unit 21 of the touch panel 2, and the plurality of pillar parts 48 are formed at such a degree of density that it is determined by the erase-operation determination unit 32 that the erase-operation is being performed.

Thereby, it is unnecessary for the user to make a mode switching operation for switching a picture mode with an eraser mode to each other, or to transmit information indicative of the erase-operation from the eraser device 4 to the touch panel 2 in order to cause the touch panel 2 to recognize the erase-operation. Thus, as the mode switching operation is not needed, the user's convenience can be increased. Further, it is unnecessary to provide both the eraser device 4 and the touch panel 2 with any communication function, so that the configuration of the command input system 100 can be simplified and a manufacturing cost can be reduced. That is, an improved command input system for easily performing the erase-operation to the touch panel 2 can be provided, inexpensively.

According to this embodiment of the present invention, the number of the pillar parts 48 (the touch parts) is set to be a number (13) larger than the number of fingers (10) of the human's both hands, and the threshold value used for determining whether or not the erase-operation is performed equals the number of the pillar parts 48, i.e., 13. Thereby, the touch operation by the human's finger can be properly differentiated from the touch operation by the eraser device 4.

However, the set number of the pillar parts 48 and the threshold value to be set should not be limited thereto. For example, the number of the pillar parts 48 may be set to be a number (e.g., 11 or more) larger than the number of fingers (10) of the human's both hands, and the threshold value may be set to be a number larger than the number of fingers (10) of the human's both hands, and the number of the pillar parts 48 or less.

Otherwise, the number of the pillar parts 48 may be set to be a number (e.g., 6 or more) larger than the number of fingers (i.e., 5) of the human's one hand, and the threshold value may be set to be a number larger than the number of fingers (5) of the human's one hand, and the number of the pillar parts 48 or less. Thereby, the touch operation by the human's one hand can be properly differentiated from the touch operation by the eraser device 4.

Further, it is preferable that a distance between the respective pillar parts 48 is set to be such a distance that it is difficult for the human finger to simultaneously touch the input points corresponding to each of the pillar parts 48. Thereby, it can be properly prevented to erroneously determine the touch operation by the human finger as the erase-operation.

Further, in this embodiment of the present invention, the first to the fourth pillar parts 48*a* to 48*d* are provided which are disposed at each of corners of the rectangle shape; and the fifth pillar parts 48*e* is provided which is disposed at the central point of the rectangle shape. As the first to the fourth pillar parts 48*a* to 48*d* of five are provided, it is difficult for the user to perform the touch operation to a position corresponding to the first to the fourth pillar parts 48*a* to 48*d* by making the five fingers narrower. Thereby, the touch operation by the user's fingertip can be properly differentiated from the touch operation by the eraser device 4.

Besides, it is preferable that a distance between the respective pillar parts 48 is set to be such a distance that the touch panel 2 can detect each of the pillar parts 48 as distinct input points according to resolution of the detection points of the touch panel 2. Thereby, it can be prevented to erroneously determine that a plurality of pillar parts 48 are recognized as the identical input points by the touch panel 2. For example, the distance between detection points in the touch panel 2 is set to be 18 mm, if the distance between the respective pillar parts 48 is set to be well larger than 18 mm (e.g., 25 mm), it can be surely prevented to erroneously determine that a plurality of pillar parts 48 are recognized as the identical input points by the touch panel 2.

Further, in this embodiment of the present invention, the conductive buffer material 46 is disposed at the edges of each of the pillar parts 48 (the edges of the touch panel 2) in the eraser device 4. Thereby, variation in detection precision owing to contact degree of each of the pillar parts 48 to the touch panel 2 can be prevented. As the conductive buffer material 46 is covered with the cloth part 44, the touch panel 2 can be prevented from being damaged or making a noise by contacting the eraser device 4 with the touch panel 2.

Further, in this embodiment of the present invention, the cloth part 44 is provided for covering the face opposite to and a part of the sides of the touch panel 2 in the eraser device 4. Thereby, friction resistance to the touch panel 2 in the eraser device 4 can be reduced. When the eraser device 4 is slid while being contacted with touch panel 2, it can be prevented that the touch panel 2 is damaged or making a noise. Further, as the cloth part 44 is provided, design of the eraser device 4 can be increased.

Second Embodiment

A second embodiment of the present invention will be described. For convenience of explanation, like elements to the first embodiment are denoted by like reference numerals in the second embodiment and their explanation is omitted.

In the first embodiment of the present invention, it is explained that the number of the pillar parts 48 (the touch parts) is set to be a number (13) larger than the number of fingers (10) of the human's both hands, and the threshold value used for determining whether or not the erase-operation is performed equals the number of the pillar parts 48, i.e., 13.

On the other hand, in the second embodiment of the present invention, the configuration of the eraser device 4 is the same but the threshold value used for determining whether or not the erase-operation is performed in the touch panel 2 is set to be the number of the pillar parts 48 aligned on a short side of the rectangular shape, i.e., 3. That is, in the second embodiment of the present invention, the mode determining unit 36 determines that the user's touch operation is the erase-operation only if there is the remarkable input point, in which the number of the input points included in the searching range is the threshold value (i.e., 3) or more. In addition, it determines that the user's touch operation is not the erase-operation only if there is not the remarkable input point.

Thereby, as it is possible to perform the eraser-operation using only a part of the bottom face of the eraser device 4 (e.g., a portion corresponding to a side of the rectangle shape forming the bottom face of the eraser device 4), the eraser-operation at a smaller area can be performed.

Figure 12:
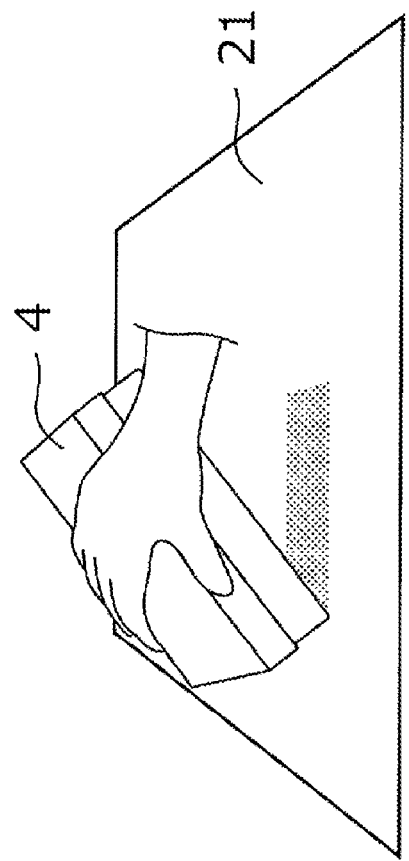
FIG. 12 is a diagram showing a condition that only a part of the eraser device makes a touch operation in the command input system according to the first embodiment of the present invention.
Figure 13:
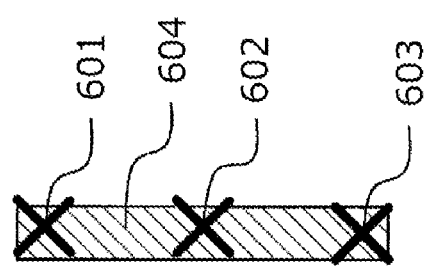
FIG. 13 is a diagram showing input points detected when the touch operation of FIG. 12 is made.

For example, as shown in FIG. 12, it is considered when the touch operation is made to the panel unit 21 on the short side of the rectangle shape in the eraser device 4. In this case, as shown in FIG. 13, input points 601, 602 and 603 corresponding to three pillar parts ([the first pillar part 48a, the second pillar part 48b and the twelfth pillar part 48l] or [the third pillar part 48c, the fourth pillar part 48d and the thirteenth pillar part 48m]) aligned on the short side are detected. As, in the second embodiment of the present invention, the threshold value used for determining whether or not the erase-operation is performed in the touch panel 2 is set to be 3, the touch panel 2 determines that it is the erase-operation.

Besides, when the erase range is set, a minimum width of the erase range may be preliminarily set, and when a difference between the maximum of the x coordinate values and the minimum of the x coordinate values in the coordinate values of the input points is smaller than the minimum width, a width of the erase range in the x direction may be set to be this minimum width. Similarly, when a difference between the maximum of the y coordinate values and the minimum of the y coordinate values in the coordinate values of the input points is smaller than the minimum width, a width of the erase range in the y direction may be set to be this minimum width. Although the minimum width should not be limited to, for example, it may be set to be approximately 5 mm.

Third Embodiment

A third embodiment of the present invention will be described. For convenience of explanation, like elements to the first embodiment are denoted by like reference numerals in the third embodiment and their explanation is omitted.

In the first embodiment of the present invention, it is explained that the user's touch operation is determined to be the erase-operation only if the remarkable input point, in which the number of the other input points included in the searching range (within the circle of the radius R1) has a number of the predetermined threshold value or more, and that the user's touch operation is determined not to be the erase-operation only if the remarkable input point, in which the number of the input points has a number less than the predetermined threshold value.

On the contrary, according to the third embodiment of the present invention, a weighting coefficient is assigned to each of the input points, according to the distance from the central point, with respect to the other input points included in the searching range centering that input point (the remarkable input point), the searching range having a predetermined size. The weighting coefficients assigned to the input points are summed and the erase-operation is determined only if the input points, at which the total is a first number V1 or more, has a number of a predetermined threshold value or more.

Figure 14:
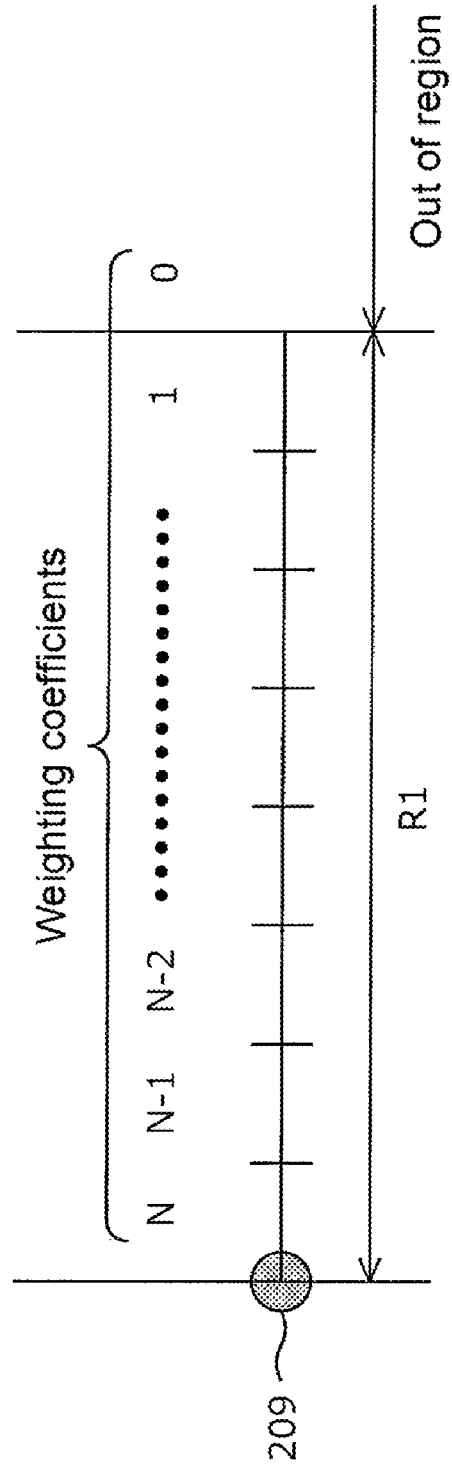
FIG. 14 is a diagram showing weighting coefficients used in the determination process for determining whether or not the user's operation is an erase-operation in a command input system according to a third embodiment of the present invention.

More particularly, as shown in FIG. 10, in the process of S3, the region setting unit 34 sets, as the searching range, the circle 301 of the radius R1 centering the remarkable input point (input point 207 in the example of FIG. 10). Then, as shown in FIG. 14, the radius R1 is divided equally into N segments (N is an integer of 2 or more). As shown in FIG. 14, with respect to the N segments into which the radius R1 is divided equally, the weighting coefficient of N is assigned to the segment closest to the central point (the input point 207) of the circle 301, the weighting coefficient of N−1 is assigned to the second closest segment, and the weighting coefficient of N−2 is assigned to the third closest segment, in such a manner that a smaller weighting coefficient is assigned to a segment farther from the central point of the circle. The weighting coefficient of 1 is assigned to the farthermost segment. The weighting coefficient of 0 is assigned to the segment farther than the radius R1.

Next, in the process of S4, the input point calculating unit 35 assigns to each of the input points, the weighting coefficient which is according to the segment to which this input point belongs, and calculates the total of the weighting coefficients assigned to the input points.

The processes of S2-S5 are executed with respect to all the input points, and the total is calculated at each of the input points when the input points are treated as the remarkable input points. Then, in the process of S6, the mode determining unit 36 determines that the user's touch operation is the erase-operation only if there is the remarkable input point, in which the number of the input points included in the searching range is the first number V1 or more. In addition, it determines that the user's touch operation is not the erase-operation only if there is not the remarkable input point, in which the number of the input points included in the searching range is the first number V1 or more. The subsequent processes are the same as the first embodiment. Besides, the mode determining unit 36 may determine that the user's touch operation is the erase-operation only if the remarkable input point, in which the number of the input points included in the searching range is the first number V1 or more, has a number of the predetermined threshold value or more.

Thereby, when the user moves the hollow of the hand or the like onto the display screen in order to perform the erase-operation, for example, even if a wrist watch, bracelet, clothing, button of the user or the like is contacted with the display screen, an undesired input point owing to this type of touch operation can be prevented from being within the erase range, so that the erase range can be stabilized.

Fourth Embodiment

A fourth embodiment of the present invention will be described. For convenience of explanation, like elements to the above-described embodiment are denoted by like reference numerals in the third embodiment and their explanation is omitted.

In the first embodiment of the present invention, the largeness of the searching range (the circle 301) of the input points set in the process of S3 is constant.

On the contrary, in the fourth embodiment of the present invention, while the erase-operations are continued, the largeness of the searching range of the input points is made to be larger than the searching range (the circle 301) before the erase-operation is determined. For example, while the erase-operations are continued, the radius of the circle as the searching range of the input points is made to be double or more which is larger than the radius of the original searching range (the circle 301) before the erase-operation is determined.

Thereby, while the erase-operations are continued, for example, even if a part of the bottom face of the eraser device 4 (a region corresponding to a part of the pillar parts 48) is tentatively separated from the display screen (the panel unit 21), the erase-operations can be prevented from being canceled contrary to the user's will, to thereby perform the erase-operations, stably.

In addition, while the erase-operations are continued, the predetermined threshold value used to determine whether or not the erase-operation is set in the process of S6 may be made to be smaller (e.g. 1) than the original threshold value. Thereby, while the erase-operations are continued, for example, a part of the hollow of the user's hand is tentatively separated from the display screen (the panel unit 21), and the erase-operations can be prevented from being canceled contrary to the user's will, to thereby perform the erase-operations, stably.

Fifth Embodiment

A fifth embodiment of the present invention will be described. For convenience of explanation, like elements to the above-described embodiment are denoted by like reference numerals in the fifth embodiment and their explanation is omitted.

Figure 15:
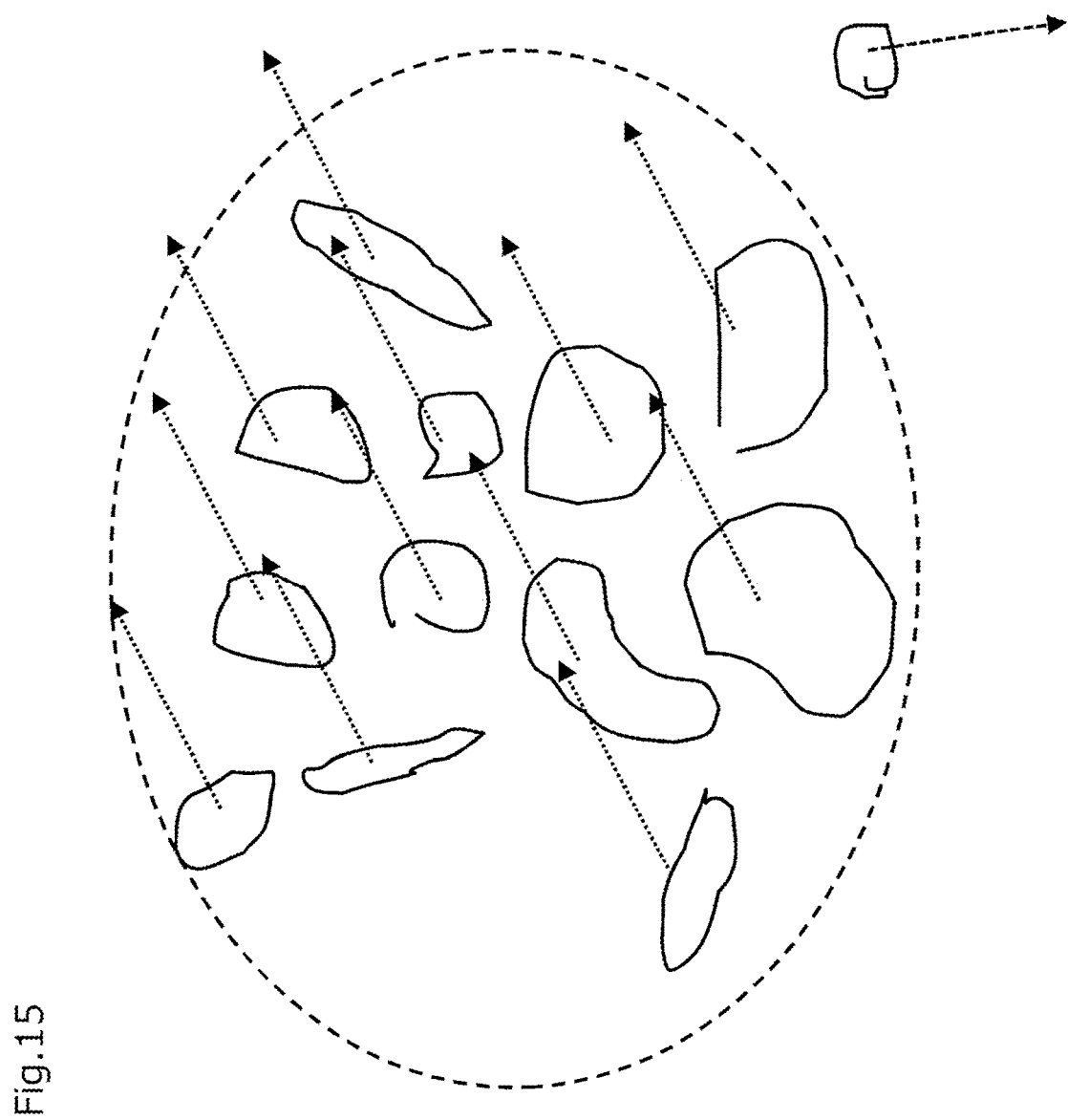
FIG. 15 is a diagram showing a concept that the erase range is set on the basis of the input points by the user according to a fifth embodiment of the present invention.

FIG. 15 is a diagram showing a concept that the erase range is set on the basis of the input points by the user according to a fifth embodiment of the present invention. As shown in FIG. 15, according to the sixth embodiment of the present invention, the mobile vectors (see, arrows in FIG. 15) of the detected input points are calculated at a predetermined time, so that the input points (see, the input points included in the broken line of FIG. 15) at which the mobile vectors are within a predetermined deflection are treated as one object, and a region including these input points is set as the erase range.

Figure 16:
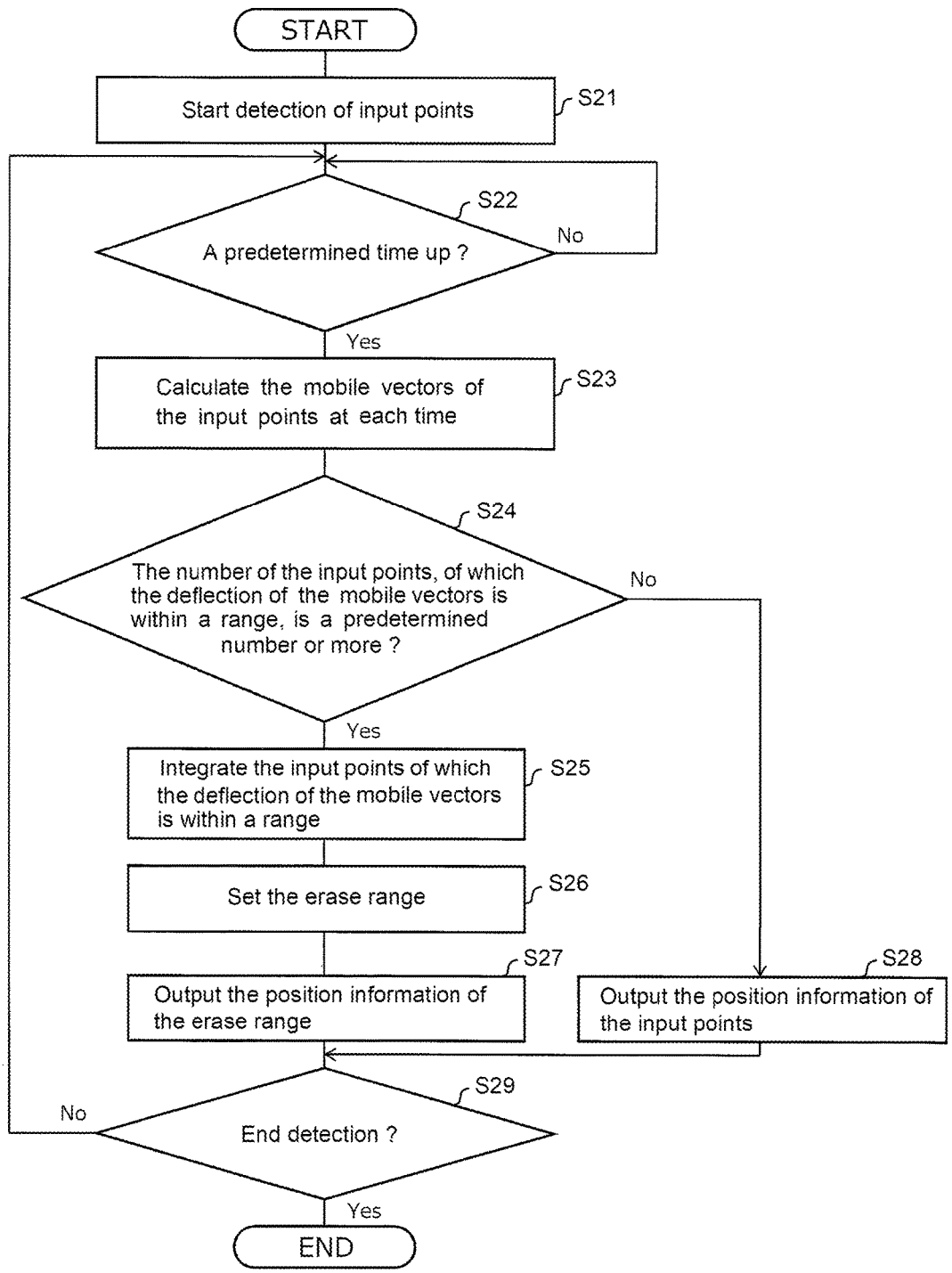
FIG. 16 is a flow chart showing a routine of detection process of command inputs by the user to the touch panel provided with the command input system according to the fifth embodiment of the present invention.

FIG. 16 is a flow chart showing a routine of detection process of instruction inputs by the user according to the fifth embodiment of the present invention.

At first, the input point detected by the input point detecting unit 31 is inputted from the panel driving unit 22. On the basis of the signal indicating the capacitance at the crossing point (detection point) of the drive line DL and the sense line SL, the detection of the input point (the user's touch operation point) at each cycle (e.g. 5 msec) is started (S21). The detection result of the input point is temporarily stored within a storage (not shown).

Further, the region setting unit 34 monitors the passage of the predetermined time (e.g. 0.1 sec) (S22) since starting the process of detecting the input point (or, since the previous calculation of the mobile vector). When it determines this passage, the mobile vector (i.e. the mobile vector from the coordinate values of the input points before the passage of the predetermined time to the coordinate values of these input points after the passage of the predetermined time) at each certain time is calculated (S23).

The mode determining unit 36 determines whether or not the number of the input points, at which the deflection of the mobile vector is within a predetermined range (e.g. the range of ±3 mm each in the x direction and they direction), is a second predetermined number N2 (e.g. 2) or more (S24). When it is determined that it is the second predetermined number N2 or more in S24, the mode determining unit 36 determines that it is the erase-operation. When it is determined that it is less than the second predetermined number N2, the mode determining unit 36 determines that it is not the erase-operation.

When, in S24, the mode determining unit 36 determines that the number of the input points, at which the deflection of the mobile vector is within a predetermined range, is the second predetermined number N2 or more, the erase range setting unit 37 integrates (groups) the input points at which the deflection of the mobile vector is within a predetermined range (S25).

Figure 17:
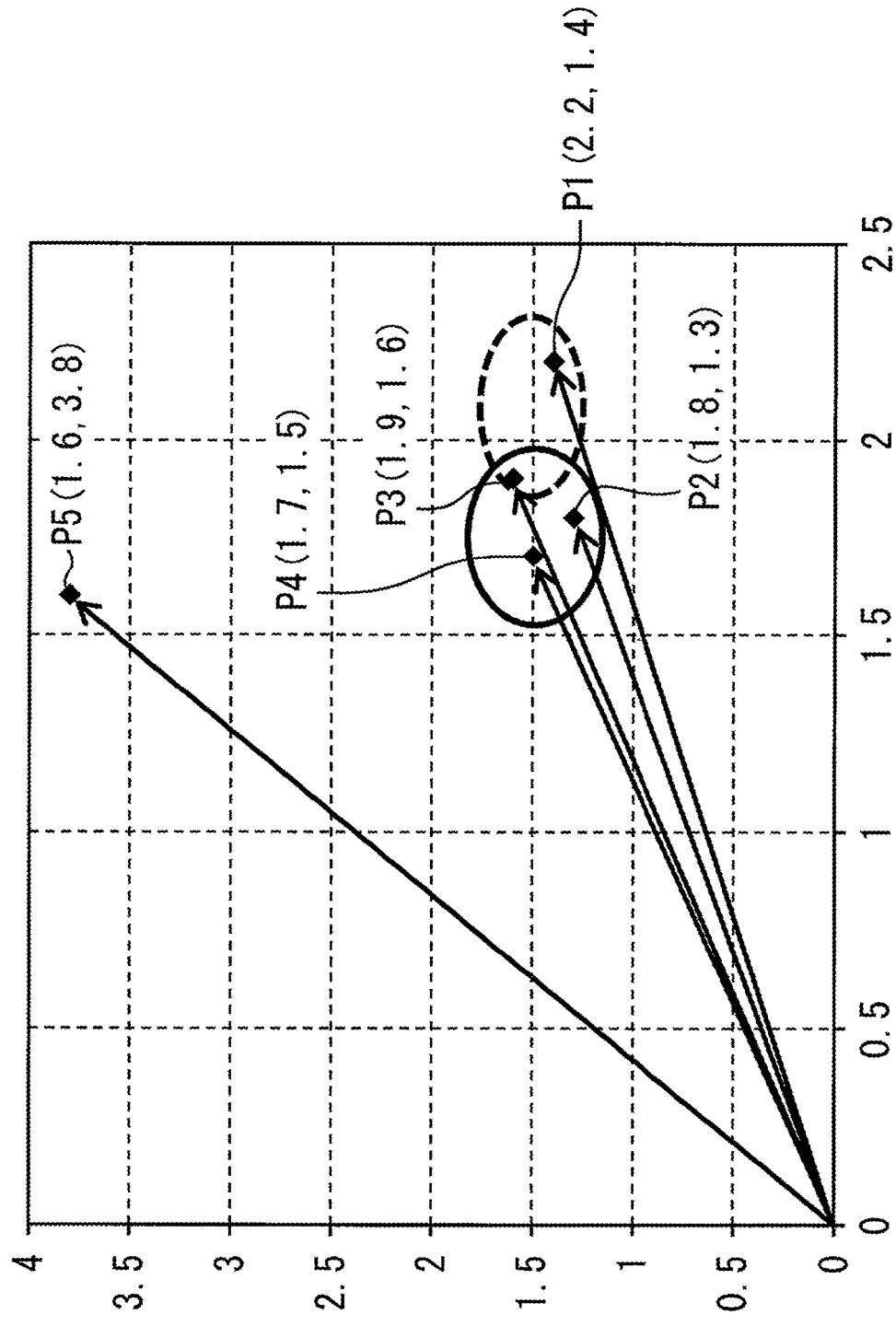
FIG. 17 is a diagram showing a determination process whether or not the erase-operation is determined on the basis of the input points according to the fifth embodiment of the present invention, and is a diagram showing a set process that the erase range is set on the basis of the input points by the user.

FIG. 17 is a diagram showing a process whether or not the erase-operation is determined on the basis of the input points, and is a diagram showing a process that the erase range is set on the basis of the input points. In the example of FIG. 17, the input points P1-P5 are detected in a period from t0=0 sec to t1=0.1 sec, and the mobile vectors (x, y) of the input points P1-P5 in a period from t0 to t1 are as follows:

P1=(2.2, 1.4), P2=(1.8, 1.3), P3=(1.9, 1.6), P4=(1.7, 1.5), P5=(1.6, 3.8).

At first, the mode determining unit 36 sorts (searches) the x coordinate values to extract the group of the input points included within the deflection of 0.3 mm, so that in the example of FIG. 17, the group of [P1, P3] and the group of [P2, P3, P4, P5] are extracted.

Next, with respect to the groups extracted on the basis of the x coordinate values, the mode determining unit 36 sorts the y coordinate values to also extract the group of the input points included within the deflection of 0.3 mm, so that in the example of FIG. 17, the group (group 1) of [P1, P3] and the group (group 2) of [P2, P3, P4, P5] are extracted.

Further, with respect to the groups extracted on the basis of the x coordinate values and the y coordinate values, the mode determining unit 36 compares the number of the input points included in each group to extract the group in which the number of the input points is more. In the example of FIG. 17, the group 2 is extracted, in which the number of the input points is more, between the groups 1 and 2. Next, the mode determining unit 36 determines whether or not the number of the input points included within the extracted group (the group 2 in the example of FIG. 17) is the second predetermined number N2 or more. If it is determined that it is the second predetermined number N2 or more, the erase range setting unit 37 integrates the input points included within the extracted group.

After the erase range setting unit 37 integrates the input points at which the deflection of the mobile vector is within a predetermined range, the mode determining unit 36 may calculate the mobile vectors of the extracted group on the basis of the average of the input points included in the extracted group, so that they are treated as one object.

Further, if input point (the touch point) is newly added, the mobile vector of the new input point may be compared with the mobile vector of the existing input point (or, the mobile vector of the integrated group) to determine whether or not the new input point is added to the integrated group of the input points.

For example, when, in the example of FIG. 17, the new input point P6 (not shown) in which the mobile vector is P6=(1.7, 1.6) is generated at time t2, assuming that the mobile vector of the group 2 is GP2=(1.7, 1.4), the input points P1 and P5 are excluded from the group 2 since they are not included within the deflection of ±0.3 mm, and the input point P6 is included within the group 2 since the x coordinate value and the y coordinate value of the P6 are included within the deflection of ±0.3 mm. The input points P1 and P5 not included in the group 2 are considered to be an input other than the erase-operation. The mobile vector of the integrated group is calculated, for example, on the basis of the average of the coordinate values of the input points included within the extracted group.

After, in S25, the input points, at which the deflection of the mobile vectors are within the predetermined range, are integrated, the erase range setting unit 37 sets the erase range on the basis of the integrated input points (S26).

More particularly, the erase range setting unit 37 extracts the maximum of the x coordinate value, the minimum of the x coordinate value, the maximum of the y coordinate value and the minimum of the y coordinate value on the basis of the coordinate values of the integrated input points in S25, so that a rectangular region defined by these extracted coordinate values is set as the erase range.

Further, the input information outputting unit 33 outputs the information indicating that it is the erase-operation and the information indicating the erase range to the information processing device 3 (S27).

As for the information indicating the erase range, the reference position (e.g. the central point) of the rectangle 501, the width 503 of the rectangle 501 in the x direction and the width 504 of the rectangle 501 in the y direction are output. Otherwise, the maximum of the x coordinate value, the minimum of the x coordinate value, the maximum of the y coordinate value and the minimum of the y coordinate value of the rectangle as the erase range may be output. Alternatively, the coordinate values of the corners of the rectangle as the erase range may be output.

Then, the touch panel control unit 23 determines whether or not the detection of the touch operation should be ended (S29). If it is not ended, the process of S22 is returned. Determining whether or not the detection of the touch operation should be ended should not be limitative, and, for example, it may be determined whether or not it receives the user's instructions of ending the touch operation, or the user's power switching off instructions, or by determining the state that the touch operation to the touch panel 2 has been ended (touch-up condition). Alternatively, it may be determined whether or not a predetermined time has passed without any touch operation on the panel unit 2.

When, in the process of S24, the mode determining unit 36 determines that it is less than the second predetermined number N2 (it is not the erase-operation), the input information outputting unit 33 outputs the position information of the input points detected at each cycle to the information processing device 3 (S28), and is advanced to the process of S29.

As described above, according to the sixth embodiment of the present invention, the region, which includes the input points at which the mobile vector of each input point calculated at each time is within a predetermined deflection, is set as the erase range.

Thereby, the input points to be included in the erase range can be decided according to the mobility of the input points. Therefore, even if another input operation (the picture operation or the like) different from the erase-operation is conducted near to the erase range, the erase-operation and another input operation can be differentiated to prevent misjudgment. In particular, the eraser device 4 is provided for performing the erase-operation, the mobile vector of the input point corresponding to each of the pillar parts 48 of the eraser device 4 is likely to be a similar value, the erase-operation can be properly differentiated from operations other than the erase-operation.

Sixth Embodiment

A sixth embodiment of the present invention will be described. For convenience of explanation, like elements to the above-described embodiment are denoted by like reference numerals in the sixth embodiment and their explanation is omitted.

Figure 18:
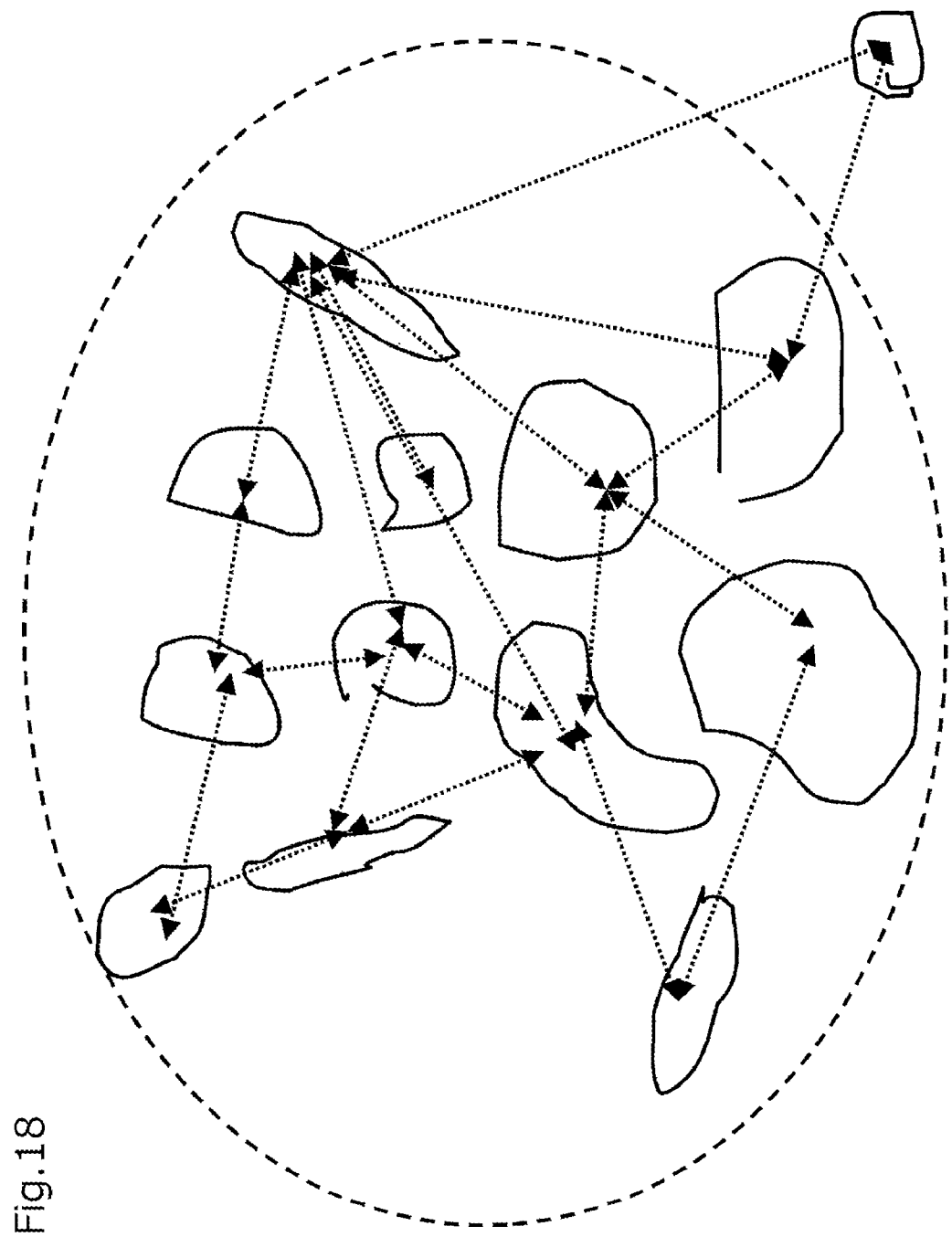
FIG. 18 is a diagram showing a concept that the erase range is set on the basis of the input points by the user according to a sixth embodiment of the present invention.

FIG. 18 is a diagram showing a concept that the erase range is set on the basis of the input points by the user. As shown in FIG. 18, according to the seventh embodiment of the present invention, with respect to the input points detected, the variation of the distance between the adjacent input points in a predetermined time is calculated, so that the input points, at which the variation of the distance is a predetermined value or less, are treated as one object, and the region including these input points is set as the erase range.

Figure 19:
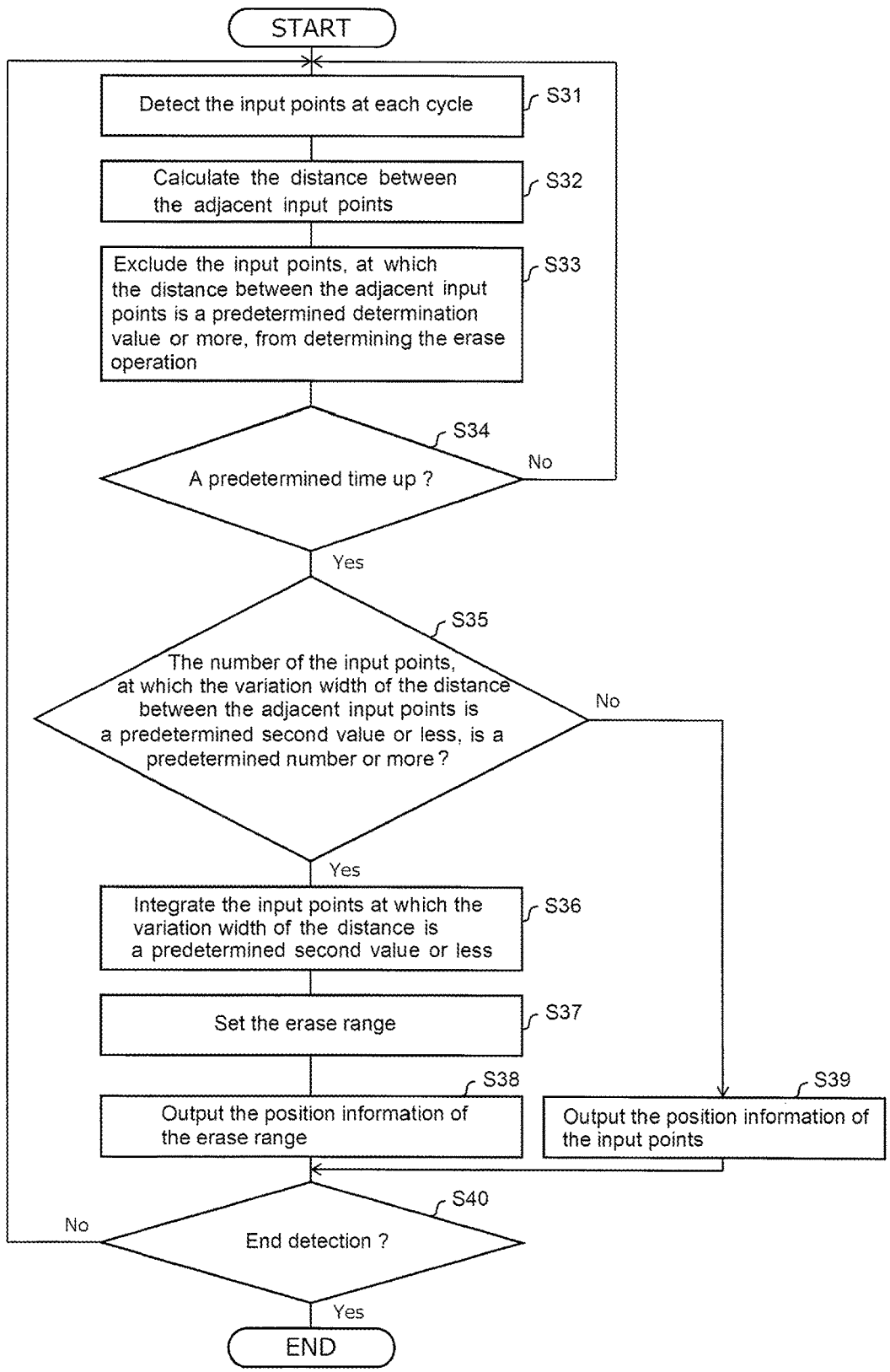
FIG. 19 is a flow chart showing a routine of detection process of command inputs by the user to the touch panel provided with the command input system according to a sixth embodiment of the present invention.

FIG. 19 is a flow chart showing a routine of detection process of the instruction inputs by the user according to the sixth embodiment of the present invention.

At first, the input point detected by the input point detecting unit 31 is inputted from the panel driving unit 22. On the basis of the signal indicating the capacitance at the crossing point (detection point) of the drive line DL and the sense line SL, the input point (the user's touch operation point) is detected at each cycle (e.g. 5 msec) (S31). The detection result of the input point is temporarily stored within a storage (not shown).

Next, the mode determining unit 36 calculates the distance (see, the arrows in FIG. 18) between the adjacent input points detected in S31 (S32). The calculation result of the distance is temporarily stored within a storage (not shown).

Next, the mode determining unit 36 excludes the input points, at which the distance between the adjacent input points is the predetermined detection value (e.g. 15 cm) or more, from the determination process whether or not it is the erase-operation (S33).

Next, the mode determining unit 36 determines whether or not a predetermined time (e.g. 50 msec) has been passed since the input points start to be continuously detected (S34). When it is determined that the predetermined time has not been passed, the process of S31 is returned.

On the other hand, when it is determined that the predetermined time has been passed, the mode determining unit 36 determines whether or not the number of the input points, at which the variation width in the distance between the adjacent input points in a predetermined time is the second predetermined value V2 (e.g. 2 mm) or less, is a third predetermined number N3 (e.g. 2) or more (S35). If it is determined in S35 that it is the third predetermined number N3 or more, the mode determining unit 36 determines that it is the erase-operation, and if it is determined that it is less than the third predetermined number N3, the mode determining unit 36 determines that it is not the erase-operation.

If, in S35, the mode determining unit 36 determines that it is the third predetermined number N3 or more, the erase range setting unit 37 integrates the input points at which the variation width in the distance between the adjacent input points is the second predetermined value V2 or less (S36).

Figure 20:
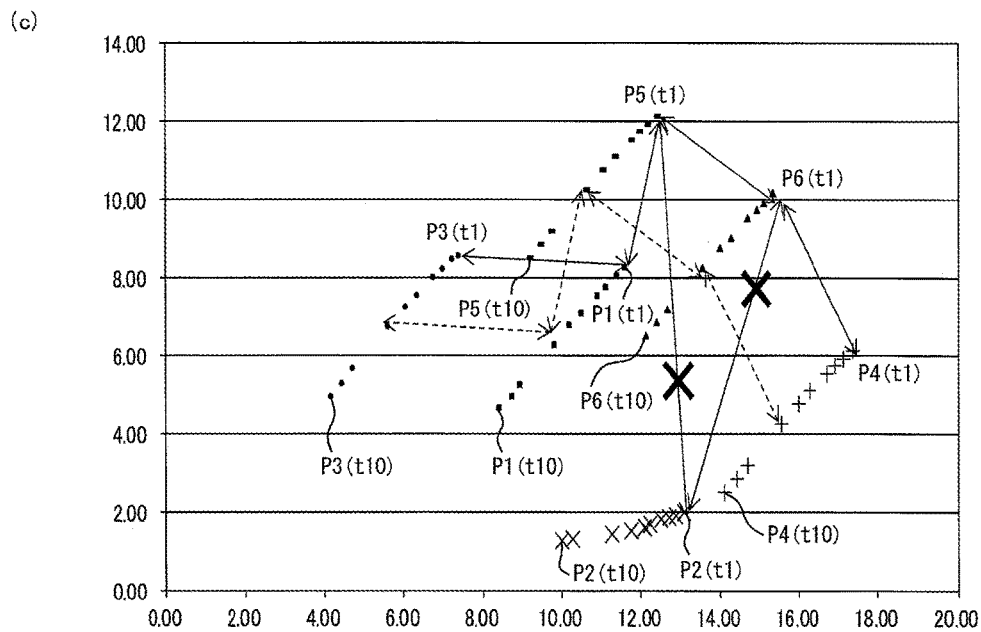
FIG. 20 is a diagram showing a determination process whether or not the erase-operation is determined on the basis of the input points according to a sixth embodiment of the present invention, and is a diagram showing a set process that the erase range is set on the basis of the input points by the user, wherein (a) is a coordinate detection value per a predetermined cycle at each input point, (b) is a distance between adjacent input points per a predetermined cycle, and (c) is an erase region set on the basis of each input point.

FIG. 20 is a diagram showing a process whether or not the erase-operation is determined on the basis of the input points, and is a diagram showing a process that the erase range is set on the basis of the input points by the user, wherein (a) is a coordinate detection value per a predetermined cycle at each input point, (b) is a distance between adjacent input points per a predetermined cycle, and (c) is an erase region set on the basis of each input point. The example of FIG. 20, the input points P1-P6 are detected in a period from t0=0 to t10=50 msec.

The mode determining unit 36 determines at each cycle whether there are existed the input points at which the distance between the adjacent input points is a predetermined detection value (e.g. 15 cm) or more, and if there are existed, these input points are excluded from the determination process whether the erase-operation is determined.

More particularly, the mode determining unit 36 sorts (searches) the input points on the basis of the x coordinate values. In the example of FIG. 20, the input points P3, P1, P5, P2, P6 and P4 are listed in the order that the x coordinate values are smaller. The difference of the x coordinate values between the input point P3 at which the x coordinate value is the minimum and the input point P4 at which the x coordinate value is the maximum does not exceed the predetermined detection value (15 cm), so that no input point is excluded from the determination process of the erase-operation. Similarly, when it sorts the input points on the basis of the y coordinate values, the input points P2, P4, P1, P3, P6 and P5 are listed in the order that the y coordinate values are smaller. The difference of the y coordinate values between the input points does not exceed the predetermined detection value (15 cm), so that no input point is excluded from the determination process of the erase-operation.

Based on the sort result of the input points on the basis of the x coordinate values, the mode determining unit 36 calculates the distances of the adjacent input points (the distances between P3-P1, P1-P5, P5-P2, P2-P6, and P6-P4). This calculation of the adjacent input points is continued in a time from t1-t10. When there is the input point at which the variation width $\Delta$max (the difference between the minimum (min) and the maximum (max)) of the distances of the input points calculated in this time is the second predetermined value V2 (e.g. 2 mm) or more, the distances are re-calculated by excluding that input point. In the example of FIG. 20, the input point P2 is excluded.

Then, the erase range setting unit 37 integrates the input points at which the variation width in the distance between the adjacent input points is the second predetermined value V2 or less (S36). If there are a plurality of groups of the input points at which the variation width in the distance between the adjacent input points is the predetermined value or less, the group having a great number of input points is selected and integrated.

Then, the erase range setting unit 37 sets the erase range on the basis of the coordinate values of the integrated input points (S37). More particularly, the erase range setting unit 37 extracts the maximum of the x coordinate value, the minimum of the x coordinate value, the maximum of the y coordinate value and the minimum of the y coordinate value on the basis of the coordinate values of the integrated input points, so that a rectangular region defined by these extracted coordinate values is set as the erase range.

Further, the input information outputting unit 33 outputs the information indicating that it is the erase-operation and the information indicating the erase range to the information processing device 3 (S38).

Then, the touch panel control unit 23 determines whether or not the detection of the touch operation should be ended (S40). If it is not ended, the process of S31 is returned.

When, in the process of S35, the mode determining unit 36 determines that the number of the input points, at which the variation width in the distance between the adjacent input points is less than the second predetermined value V2, is less than a third predetermined number N3 (it is determined that it is not the erase-operation), the input information outputting unit 33 outputs the position information of the input points detected in S31 to the information processing device 3 (S39), and is advanced to the process of S40.

After the input points are integrated to set the erase range, the coordinate values of the erase range are calculated on the basis of the coordinate values of the integrated input points detected at each cycle. In addition, the area of the rectangular region defined by the maximum of the x coordinate value, the minimum of the x coordinate value, the maximum of the y coordinate value and the minimum of the y coordinate value of the integrated input points is continuously monitored, so that when the area is changed more than a predetermined proportion from the original area of the erase range, the integration process of the input points and the setting process of the erase range may be resumed. Thereby, even if the input points to be integrated are increased or decreased after setting the erase range, the erase range corresponding to the touch operations can be set, properly. Further, in this way, until the area is enlarged more than a predetermined condition, it is only to set the position of erase range on the basis of the coordinate values of the integrated input points, so that the calculation process of the distances between the input points can be omitted to thereby simplify the calculation process.

Figure 21:
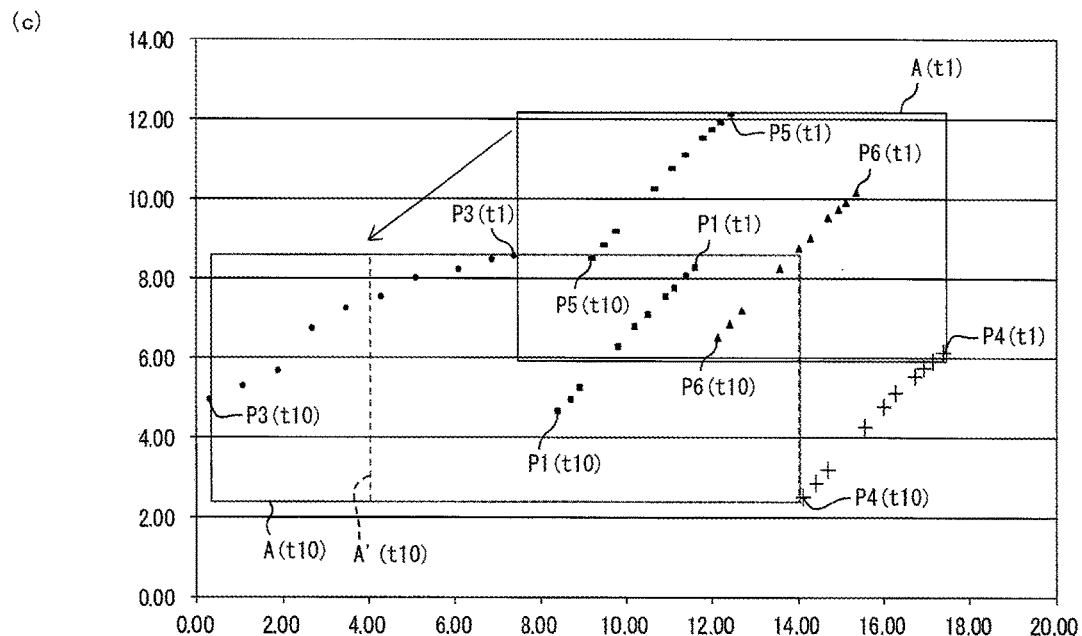
FIG. 21 is a diagram showing a process after the erase range is set on the basis of the input points by the user according to the sixth embodiment of the present invention, wherein (a) is a coordinate detection value per a predetermined cycle at each input point, (b) is a distance between adjacent input points per a predetermined cycle, and (c) is an erase region set on the basis of each input point.

For example, as shown in FIG. 21, the input points P1(t0), P3(t0), P4(t0), P4(t0), P5(t0) and P6(t0) are integrated at the time t0. The area of the rectangular region A(t0) defined by the maximum of the x coordinate value, the minimum of the x coordinate value, the maximum of the y coordinate value and the minimum of the y coordinate value of these integrated input points are calculated and stored in a storage (not shown).

Then, the area of the rectangular region A defined by the input points P1 and P3-P6 is monitored, so that when the area of the rectangular region A is changed from the area in the time t0 more than a predetermined condition, it is decided that there is existed the input point at which the distance from the other input points is largely changed. The integrated input points are set again.

In the case of FIG. 21, the input point P3 is gradually separated from the other input points, so that the area rectangular region A is gradually enlarged from the area of the rectangular region A(t0) in the time t0 to the area of the rectangular region A(t10) in the time t10. In this case, when at least one of the difference between the maximum and the minimum of the x coordinate values of the integrated input points, and the other difference between the maximum and the minimum of the y coordinate values of the integrated input points is enlarged from the area of the rectangular region A(t0) in the time t0 more than a predetermined value (e.g. 5 mm), the calculation of the integrated input points is resumed. The input point P3 is excluded from the input points to be integrated. Besides, the input point P3 may be the input point for the picture operation, but not the input point for the erase-operation.

As described above, according to the sixth embodiment of the present invention, the region including the input points at which the variation amount in the distance between the input points in each cycle is the predetermined value or less, is set as the erase range.

Thereby, the input points to be included in the erase range can be decided according to the variation of the distance between the input points at each cycle. Therefore, even if another input operation by the eraser device 4 is conducted near to the touch operation in the eraser device 4, the erase-operation and another input operation can be properly differentiated to prevent misjudgment. Further, if the region of executing the erase-operations is moved not only linearly but also curvedly, the input points to be integrated can be properly detected.

Seventh Embodiment

A seventh embodiment of the present invention will be described. For convenience of explanation, like elements to the above-described embodiment are denoted by like reference numerals in the seventh embodiment and their explanation is omitted.

The seventh embodiment of the present invention combines the integration method of the input points according to the sixth embodiment of the present invention (the method to integrate the input points at which the mobile vectors of the detected input points at each time is within the predetermined deflection) with the integration method of the input points according to the seventh embodiment of the present invention (the method to integrate the input points at which the variation width of the distances between the adjacent detected input points at each time is the second predetermined value V2 or less).

Figure 22:
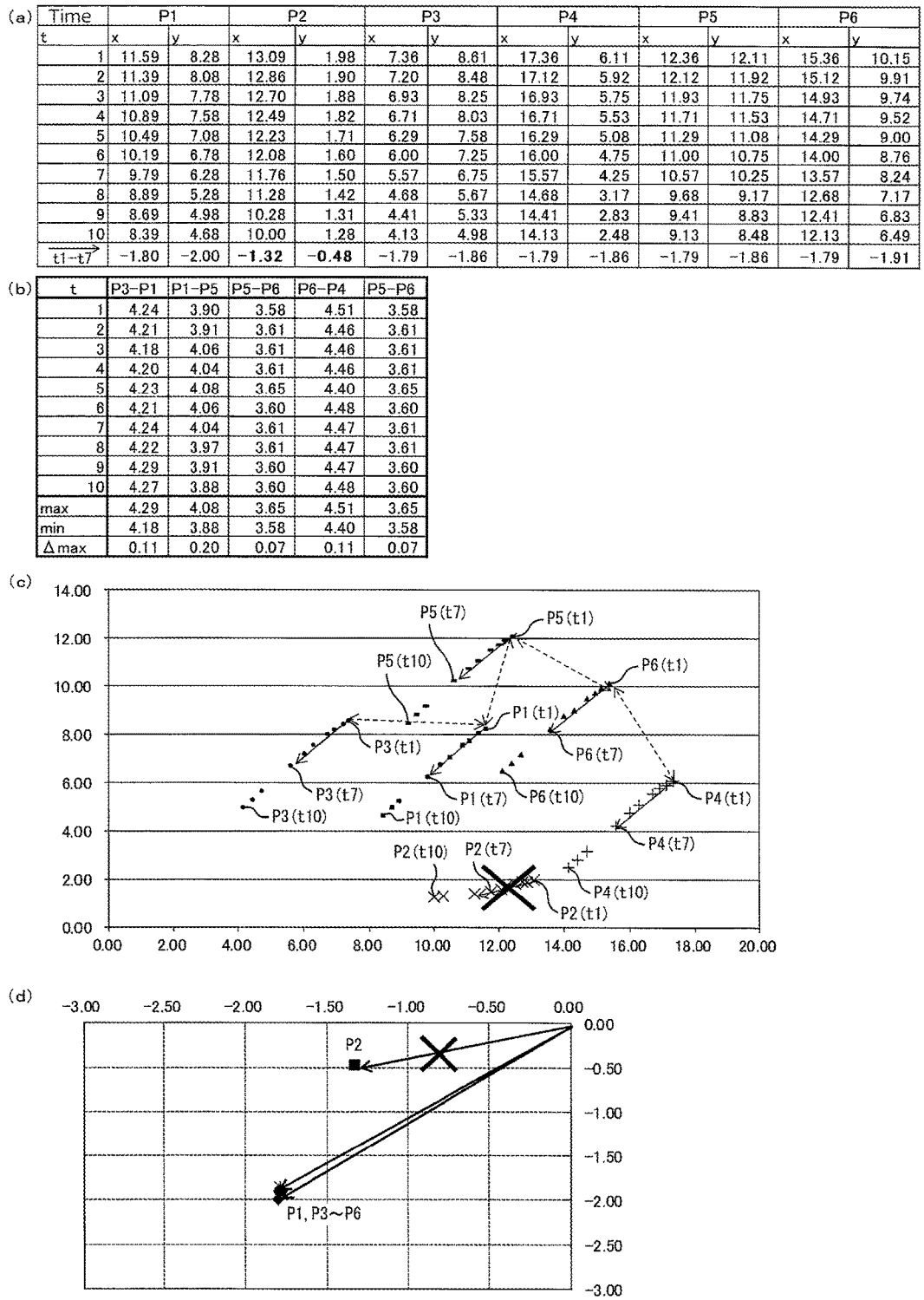
FIG. 22 is a diagram showing a determination process whether or not the erase-operation is determined on the basis of the input points according to the sixth embodiment of the present invention, and is a diagram showing a set process that the erase range is set on the basis of the input points by the user, wherein (a) is a coordinate detection value per a predetermined cycle at each input point, (b) is a distance between adjacent input points per a predetermined cycle, (c) is a detected coordinate value of the each input point, and (d) is a mobile vector at each input point.

FIG. 22 is a diagram showing a process whether or not the erase-operation is determined on the basis of the input points, and is a diagram showing a process that the erase range is set on the basis of the input points by the user, wherein (a) is a coordinate detection value per a predetermined cycle at each input point, (b) is a distance between adjacent input points per a predetermined cycle, (c) is a detected coordinate value of the each input point, and (d) is a mobile vector at each input point. The example of FIG. 22 is based on the measurement data similar to the example of FIG. 20. The input points P1-P6 are detected in the time from t0=0 sec to t10=50 msec.

At first, the input point detecting unit 31 detects the input points at each cycle (e.g. 5 msec in the seventh embodiment of the present invention). Then, the region setting unit 34 calculates the mobile vectors at each time (30 msec as the period from t1 to t7 in the seventh embodiment of the present invention). The mode determining unit 36 excludes the input points at which the deflection of the mobile vectors is out of a predetermined range (e.g. the range of ±3 mm each in the x direction and the y direction) from the input points to be integrated. Thereby, in the example of FIG. 17, as shown in (a), the mobile vector of the input point P2 is out of the predetermined range, so that, as shown in (c) and (d), the input point P2 is excluded from the input points to be integrated, at the time t7.

When the number of the input points, at which the deflection of the mobile vectors is within the predetermined range, is less than the second predetermined number N (e.g. 2), the mode determining unit 36 determines that it is not the erase-operation.

On the other hand, when the number of the input points, at which the deflection of the mobile vectors is within the predetermined range, is the second predetermined number N (e.g. 2) or more, the mode determining unit 36 calculates the variation of the distance between the adjacent input points in the predetermined period each time the period (50 msec as the period from t1 to t10 in the seventh embodiment of the present invention) is passed.

When the number of the input points, at which the variation is the second predetermined value V2 (e.g. 2 mm) or less, is less than the third predetermined number N3 (e.g. 2), the mode determining unit 36 determines that it is not the erase-operation.

On the other hand, when the number of the input points, at which the variation is the second predetermined value V2 or less, is the third predetermined number N3 or more, the mode determining unit 36 determines that it is the erase-operation. In this case, the erase range setting unit 37 sets the region including the input points, at which the variation is the second predetermined value V2 or less, as the erase range.

According to the seventh embodiment of the present invention, after the input points to be integrated are narrowed down on the basis of the deflection of the mobile vectors of the input points, it is determined whether or not the narrowed-down input points are those to be integrated on the basis of the variation of the distances between the input points.

Then, the calculation process for integrating the input points on the basis of the variation of the distances between the input points can be simplified.

In the case of FIG. 22, the input point P2 is excluded at the time of t7. Accordingly, when it is determined whether or not the input point is to be integrated on the basis of the variation of the distance between the input points in the time of t10, it is only to calculate the input points P1 and P3-P6 except for the input point P2. The calculation can be simplified.

The integration method of the input points according to the sixth embodiment of the present invention (the method to integrate the input points at which the mobile vectors of the detected input points at each time is within the predetermined deflection) is easy to calculate other than the integration method of the input points according to the seventh embodiment of the present invention (the method to integrate the input points at which the variation width of the distances between the adjacent detected input points at each time is the second predetermined value V2) or less. On the other hand, the integration method of the input points according to the seventh embodiment of the present invention can provide higher correctness in setting the erase range than the integration method of the input points according to the sixth embodiment of the present invention. Therefore, the eighth embodiment of the present invention can provide both advantages of the integration method of the input points according to the sixth embodiment of the present invention and the integration method of the input points according to the seventh embodiment of the present invention. Therefore, the setting of the erase range can be correctly by the simplified calculation.

After the input points are narrowed down by the integration method of the input points according to the sixth embodiment of the present invention (the method to integrate the input points at which the mobile vectors of the detected input points at each time is within the predetermined deflection), the distances between the input points may be calculated, so that the input point of which the calculated distances are more than a predetermined determination value may be excluded from those to be integrated by this judgment. Thereby, for example, even if the user's cloth is contacted with the panel unit 21 in performing the erase-operation using the eraser device 4, the distance between the input point by the user's sleeve and the input point for the erase-operation may be longer than the distance between the input points for the erase-operations, so that the input point by the user's sleeve can be excluded from the input points to be integrated. Therefore, even if the user's cloth is contacted with the panel unit 21 in performing the erase-operation using the eraser device 4, it is possible to prevent the displayed image from being erased contrary to the user's will.

Eighth Embodiment

In each of the embodiments of the present invention, the touch panel control unit 23 of the touch panel 2 may be embodied by a logic circuit (hardware) formed in an integrated circuit (IC chip) or the like, or software using CPU (central Processing Unit).

In the latter case, the touch panel control unit 23 includes CPU for executing instructions of a program which is a software for embodying functions, a ROM (Read Only Memory) or a storage (they are called "recording medium") for storing the program and data in a readable manner by a computer (or CPU), a RAM (Random Access Memory) for developing the program. The computer (or CPU) reads the program from the recording medium and executes the program, so that the object of the present invention is attained. As for the recording medium, "an objective medium not temporary", for example, including a tape, disk, card, semiconductor memory, programmable logic circuit or the like may be used. The program may be transmitted to the computer via a transmittable transfer medium (communication network, broadcast, or the like). In addition, the program of the present invention can be embodied by the electronic transfer in the form of data signals embedded in the carrier waves.

CONCLUSION

According to a first mode of the present invention, an eraser device 4 for inputting an erase-operation of a display image to a touch panel 2, the touch panel 2 includes an input point detection unit 31 for detecting, as input points based on a plurality of detection points arranged on or near to a display screen, detecting points where a touch operation is performed; and an erase-operation determination unit 32 for determining whether or not a user's operation is the erase-operation, according to a degree of density of the input points, wherein the eraser device 4 includes a plurality of touch parts (pillar parts 48) to be detected as the input points when brought into contact with or closer to the touch panel, and the plurality of touch parts (pillar parts 48) are formed at such a degree of density that it is determined by the erase-operation determination unit that the erase-operation is being performed.

According to the above configuration, by performing the user's touch operation on the display screen of the touch panel 2 using the eraser device 4, it is possible to cause the touch panel 2 to detect each of the touch parts (pillar parts 48) of the eraser device 4 as the input points, and cause the touch parts to be at such a degree of density that it is determined that the erase-operation is being performed. Accordingly, even if information indicative of an erase command is not transmitted from the eraser device 4 to the touch panel 2, it is possible to cause the touch panel 2 to recognize the erase-operation. Therefore, it is unnecessary to provide both the eraser device 4 and the touch panel 2 with any communicating function, so that a manufacturing cost of the eraser device 4 and the touch panel 2 can be reduced. Further, a mode switching operation to switch a picture mode and an erasure mode to each other is not made, it is possible to cause the touch panel 2 to recognize the erase-operation, so that user's convenience can be increased. Hence, according to the present invention, an improved command input system 100 for easily performing the erase-operation to the touch panel 2 can be provided, inexpensively.

In the eraser device 4 according to a second mode of the present invention, the eraser device 4 in the first mode of the present invention is modified so as to be a touch panel of a capacitance type; the eraser device 4 includes a plurality of touch parts (pillar parts 48) and a grip part 41 which the user handles; both the touch parts (pillar parts 48) and the grip part 41 are conductive; and the touch parts (pillar parts 48) and the grip part 41 are electrically conducted.

According to the above configuration, each of the touch parts (pillar parts 48) provided to the eraser device 4 can be electrically conducted with the user for handling the eraser device 4 and they can be grounded, so that detection precision of each of the touch parts (pillar parts 48) can be increased.

In the eraser device 4 according to a third mode of the present invention, the eraser device 4 in the second mode of the present invention is modified to comprise a plurality of conductive pillar parts 48 for protruding in a certain direction, and a conductive buffer material (conductive buffer material 46) attached to the tip of each of the pillar parts 48 in the certain direction so as to be conducted with the pillar parts 48.

According to the above configuration, variation in detection precision owing to contact degree of each of the touch parts (the pillar parts 48 and the conductive buffer material 46) to the touch panel 2 can be prevented. As the touch parts are covered with a cloth part 44, the touch panel 2 can be prevented from being damaged or making a noise by contacting the eraser device 4 with the touch panel 2.

In the eraser device 4 according to a fourth mode of the present invention, the eraser device 4 in the third mode of the present invention is modified so that a region between the respective pillar parts is provided with a pillar protection part 43 which is made of a nonconductive elastic material.

According to the above configuration, when the eraser device 4 is contacted with the touch panel 2, any load served to the respective pillar parts 48 can be reduced by the pillar protection part 43 made of a nonconductive elastic material, so that the respective pillar parts 48 can be prevented from being broken or damaged.

In the eraser device 4 according to a fifth mode of the present invention, the eraser device 4, in either one of the first mode to the fourth mode of the present invention, is modified so that, among a plurality of touch parts (pillar parts 48), all the plurality of touch parts (a first pillar part 48*a* to a thirteenth pillar part 48*m*) are arranged at four corners in the rectangular shape corresponding to a first touch part to a fourth touch part (the first pillar part 48*a* to a fourth pillar part 48*d*); and, among the plurality of touch parts (the first pillar part 48*a* to the thirteenth pillar part 48*m*), a fifth touch part (a fifth pillar part 48*e*) is arranged at a central part of the rectangular shape.

According to the above configuration, an erase range can be easily identified on the basis of detection points of input points corresponding to the respective touch parts (the first pillar part 48*a* to the thirteenth pillar part 48*m*). Further, as compared with the case where touch parts (a first pillar part 48*a* to a fourth pillar part 48*d*) are arranged only at a horn of a rectangular shape, a degree of density of the respective touch parts (the first pillar part 48*a* to the thirteenth pillar part 48*m*) can be increased. Thereby, a touch operation by the eraser device 4 can be easily differentiated from the touch operation by the user's finger or pen.

According to a sixth mode of the present invention, a command input system 100 is featured in that it includes a touch panel 2, and an eraser device 4 which is either one of the first mode to the fifth mode of the present invention, the touch panel 2 includes: an input point detection unit 31 for detecting, as input points based on a plurality of detection points arranged on a display screen, detecting points where a touch operation is performed; and an erase-operation determination unit 32 for determining whether or not a user's operation is the erase-operation, according to a degree of density of the input points.

According to the above configuration, by performing the user's touch operation on the display screen of the touch panel 2 using the eraser device 4, it is possible to cause the touch panel 2 to detect each of the touch parts (pillar parts 48) of the eraser device 4 as the input points, and cause the touch parts to be at such a degree of density that it is determined that the erase-operation is being performed. Accordingly, even if information indicative of an erase command is not transmitted from the eraser device 4 to the touch panel 2, it is possible to cause the touch panel 2 to recognize the erase-operation. Therefore, it is unnecessary to provide both the eraser device 4 and the touch panel 2 with any communicating function, so that a manufacturing cost of the eraser device 4 and the touch panel 2 can be reduced. Further, a mode switching operation to switch a picture mode and an erasure mode to each other is not made, it is possible to cause the touch panel 2 to recognize the erase-operation, so that user's convenience can be increased. Hence, according to the present invention, an improved command input system 100 for easily performing the erase-operation to the touch panel 2 can be provided, inexpensively.

In a command input system 100 according to the seventh mode of the present invention, a distance between the touch parts (pillar parts 48) in the sixth mode of the present invention is modified to be such a distance that an input point detection unit 31 can detect the touch parts (pillar parts 48) as distinct input points.

According to the above configuration, as the touch parts (pillar parts 48) are detected as respective distinct input points, a degree of density of the input points can be properly evaluated.

In a command input system 100 according to an eighth mode of the present invention, the erase-operation determining unit 32 in the sixth mode or the seventh mode of the present invention is modified so as to include the region setting unit 34 for selecting one of the input points detected by the input point detecting unit 31 as a remarkable input point one by one, and for setting the predetermined region centering the selected remarkable input point as a searching range of the remarkable input point; the input point calculating unit 35 for calculating the number of the input points existing in the searching range for every remarkable input point; and the mode determining unit 36 for determining that the user's operation is the erase-operation in a case where the number of such remarkable input points that the number of the remarkable input points calculated by the input point calculating unit 35 is the first predetermined number N1 or more is a predetermined threshold value or more.

According to the above configuration, the user's touch operation is determined to be the erase-operation by calculating the number of the other input points existing in the predetermined range other than the input point only if the number of the other input points, in which the number of the input points included in the searching range is a first number N1 or more, has a number of a predetermined threshold value or more. Then, it can be properly determined whether or not the user's operation is the erase-operation, according to a degree of density of the input points.

In a command input system 100 according to a ninth mode of the present invention, when the mode determining unit 36 determines that the user's touch operation is the erase-operation, the erase-operation determining unit 32 in the eighth mode of the present invention is modified so as to include the erase range setting unit 37 for setting as an erase range to perform an erase process to the image, when the mode determining unit 36 determines that a user's touch operation is the erase-operation, a region including respective input points included within an integration determining range having a reference position and a certain size where the reference position is a position of an input point having a maximum value calculated by the input point calculating unit among the input points detected by the input point detecting unit 31.

According to the above configuration, the erase range can be set according to the input points included within the integration determining range, so that the region according to the user's touch operation can be set as the erase range.

In a command input system 100 according to a tenth mode of the present invention, the erase-operation determining unit 32 in the sixth mode or the seventh mode of the present invention is modified so as to include the region setting unit 34 for selecting one of the input points detected by the input point detecting unit 31 as a remarkable input points one by one, and for setting a predetermined region centering the selected remarkable input point as a searching range of the remarkable input point; the input point calculating unit 35 for assigning a weighting coefficient, which is smaller as a distance between an input point in the searching range and the remarkable input point is longer, to each input points existing in the searching range, and for calculating a total per every remarkable input points, the total summing the assigned weighting coefficients to each input points; and the mode determining unit 36 for determining that the user's operation is the erase-operation in a case where the number of such remarkable input points that the total calculated by the input point calculating unit 35 is the first predetermined value V1 or more is a predetermined threshold value or more.

According to the above configuration, the weighting coefficients, which are smaller as the distance between the input point and the remarkable input point is longer, are assigned to the input points, and it is determined that the user's operation is the erase-operation if the input points, of which the total summed is the first predetermined value V1 or more, has a number of the predetermined threshold value or more. Then, it can be properly determined whether or not the user's operation is the erase-operation, according to a degree of density of the input points.

In a command input system 100 according to an eleventh mode of the present invention, when the mode determining unit 36 determines that the user's touch operation is the erase-operation, the erase-operation determining unit 32 in the tenth mode of the present invention is modified so as to include the erase range setting unit 37 for setting as an erase range to perform an erase process to the image, when the mode determining unit determines that a user's touch operation is the erase-operation, a region including respective input points included within an integration determining range having a reference position and a certain size where the reference position is a position of an input point having a maximum total value calculated by the input point calculating unit among the input points detected by the input point detecting unit 31.

According to the above configuration, the erase range can be set according to the input points included within the integration determining range, so that the region according to the user's touch operation can be set as the erase range. Further, since the input points to be included within the erase range are selected on the basis of the weighting according to the distance between the input points, even if the variation of the contacting degree of the user's touch operation to display panel causes the change of the input points, the erase range can be properly set.

In a command input system 100 according to a twelfth mode of the present invention, the erase-operation determining unit 32 in the sixth mode or the seventh mode of the present invention is modified so as to include the mode determining unit 36 for determining that the user's operation is the erase-operation in a case where there exist a second predetermined number or more such input points that a mobile vector calculated for each of the input points at every predetermined time has deflection within a predetermined range among the input points detected by the input point detecting unit 31; and the erase-operation determining unit 32 in the sixth mode or the seventh mode of the present invention is modified so as to include the erase range setting unit 37 for setting as an erase range to erase the image, a region including each of the input points having the mobile vector within the predetermined deflection, when the erase-operation determining unit 32 determines that it is the erase-operation.

According to the above configuration, the input points to be included in the erase range can be decided according to the mobility of the input points (the touch point by the user's touch operation). Therefore, even if another input operation (the picture operation or the like) different from the erase-operation is conducted near to the erase range, the erase-operation and another input operation can be differentiated to prevent misjudgment.

In a command input system 100 according to a thirteenth mode of the present invention, when the mode determining unit 36 determines that the user's touch operation is the erase-operation, the erase-operation determining unit 32 in the sixth mode or the seventh mode of the present invention is modified so as to include the mode determining unit 36 for determining that the user's operation is the erase-operation in case where there exist a third predetermined number N3 or more of such input points that a variation width of a distances between the input points in a predetermined time is the predetermined value or less among the input points detected by the input point detecting unit 31; and the erase-operation determining unit 32 in the sixth mode or the seventh mode of the present invention is modified so as to include the erase range setting unit 37 for setting as an erase range to erase the image, a region including each of the input points having the second predetermined value V2 or less variation width of the distance between the input points in the predetermined time, when the mode determining unit 36 determines that it is the erase-operation.

According to the above configuration, the input points to be included in the erase range can be decided according to the mobility of the input points (the touch point by the user's touch operation). Therefore, even if another input operation (the picture operation or the like) different from the erase-operation is conducted near to the erase range, the erase-operation and another input operation can be differentiated to prevent misjudgment.

In a command input system 100 according to a fourteenth mode of the present invention, the erase-operation determining unit 32 in the sixth mode or the seventh mode of the present invention is modified so as to include the mode determining unit 36 for determining that the user's operation is the erase-operation in a case where there exist a second predetermined number N2 or more of such input points that a mobile vector calculated for each of the input points at every predetermined time has deflection within a second predetermined value V2 among the input points detected by the input point detecting unit 31 and there exist a third predetermined number N3 or more of such input points that a variation width of a distance between the input points in a predetermined time is a second predetermined value V2 or less; and the erase-operation determining unit 32 in the sixth mode or the seventh mode of the present invention is modified so as to include the erase range setting unit 37 for setting, as the erase range to erase the image, a region including each of the input points having the mobile vector within a predetermined deflection and having the second predetermined value V2 or less variation width of the distance between the input points in the predetermined time, when the erase-operation determining unit 32 determines that it is the erase-operation.

According to the above configuration, the input points to be included in the erase range can be decided according to the mobility of the input points (the touch point by the user's touch operation). Therefore, even if another input operation (the picture operation or the like) different from the erase-operation is conducted near to the erase range, the erase-operation and another input operation can be differentiated to prevent misjudgment.

As this invention may be embodied in several forms without departing from the spirit or essential characteristics thereof, the present embodiments are therefore illustrative and not restrictive. It is understood that the present disclosure of the preferred form has been changed in the details of construction and the combination and arrangement of parts may be resorted to without departing from the sprit and the scope of the invention as hereinafter claimed. Further, the technical means disclosed in each of the present embodiments are combined to make new technical features.

INDUSTRIAL APPLICABILITY

It is possible to apply the present invention to the touch panel for erasing a part of the image displayed on the display screen according to the user's touch operation.

EXPLANATION OF REFERENCE NUMERALS 1 display device
2 touch panel
3 information processing device
4 eraser device
11 display unit
12 display driving unit
13 display control unit
21 panel unit
22 panel driving unit
23 touch panel control unit
24 transmitter unit
25 receiver unit
26 drive control unit
27 erase range setting unit
31 input point detecting unit
32 erase-operation determining unit
33 input information outputting unit
34 region setting unit
35 input point calculating unit
36 mode determining unit
37 erase range setting unit
41 grip part
42 body part
43 pillar protection part
43a concavities
44 cloth part
44a edges
45 screws
46 conductive buffer material
46a buffer material
46b conductive membrane
47 conductive adhesive material
48 (48a-48m) pillar parts (touch parts)
49 base part
100 command input system

What is claimed is:

1. An input device for inputting a predetermined operation to a touch panel comprising:
a plurality of touch portions detected as input points when brought into contact with or closer to the touch panel; wherein
the touch panel includes a plurality of detection points on a display screen; and
the touch panel includes input detection circuitry that detects, as the input points from among the plurality of the detection points arranged on the display screen, one or more detecting points corresponding to one or more touched touch portions among the plurality of touch portions of the input device where a touch operation is performed;
the touch panel further includes operation determination circuitry that determines whether or not the touch operation is the predetermined operation, based on a degree of density of the input points; and
the plurality of touch portions have a degree of density that enables the operation determination circuitry to determine that the predetermined operation is being performed.

2. The input device according to claim 1, wherein
the touch panel is a capacitance touch panel;
the input device further comprises a grip portion which a user handles;
both the touch portions and the grip portion are conductive; and
the touch portions and the grip portion are electrically conducted.

3. The input device according to claim 1, wherein
a position of each of the touch portions ensures that all of the plurality of touch portions are arranged in a rectangular area of which four corners correspond to a first touch portion to a fourth touch portion of the plurality of touch portions; and
a fifth touch portion of the plurality of touch portions is arranged at a central portion of the rectangular area.

4. The input device according to claim 1, wherein
the input device further comprises a grip portion which a user handles; and
each of the touch portions further includes a pillar portion that protrudes in a perpendicular or substantially perpendicular direction from the grip portion to a facing surface where the touch portions face the grip portion.

5. The input device according to claim 4, wherein
the pillar portions are electrically conductive and an electrically conductive buffer material is provided at tips of respective ones of the pillar portions.

6. The input device according to claim 4, wherein a region between respective pairs of the pillar portions is further provided with a pillar protection portion which is made of an electrically nonconductive elastic material.

7. A command input system for inputting a predetermined operation to a touch panel, the command input system comprising:
the touch panel; and
an input device including a plurality of touch portions to be detected as input points when brought into contact with or closer to the touch panel; wherein
the touch panel includes a plurality of detection points on a display screen; and
the touch panel includes input detection circuitry that detects, as the input points from among the plurality of the detection points arranged on the display screen, one or more detecting points corresponding to one or more touched touch portions among the plurality of touch portions of the input device where a touch operation is performed;
the touch panel further includes operation determination circuitry that determines whether or not the touch operation is the predetermined operation, based on a degree of density of the input points; and the plurality of touch portions have a degree of density that enables the operation determination circuitry to determine that the predetermined operation is being performed.

8. The command input system according to claim 7, wherein
the predetermined operation is an erase-operation of a display image on a display screen.

9. The command input system according to claim 7, wherein a distance between the touch portions is determined so as to detect the input points via the touch portions by the input detection circuitry.

10. The command input system according to claim 7, wherein the operation determining circuitry includes:
mode determining circuitry that determines that a user's operation is the predetermined operation in a case where there exists a second predetermined number or more of the input points that a mobile vector calculated for each of the input points at every predetermined time has deflection within a predetermined range among the input points detected by the input point detecting circuitry; and
range setting circuitry that sets, as a range to process the image, a region including each of the input points having the mobile vector within the predetermined deflection, when the mode determining circuitry determines that it is the predetermined operation.

11. The command input system according to claim 7, wherein the operation determining circuit includes:
mode determining circuitry that determines that a user's operation is the predetermined operation in a case where there exists a third predetermined number or more of such input points that a variation width of a distance between the input points in a predetermined time is a second predetermined value or less among the input points detected by the input point detecting circuitry; and
range setting circuitry that sets, as a range to process the image, a region including each of the input points having the second predetermined value or less variation width of the distance between the input points in the predetermined time, when the mode determining circuitry determines that it is the predetermined operation.

12. The command input system according to claim 7, wherein the operation determining circuitry includes:
mode determining circuitry that determines that a user's operation is the predetermined operation in a case where there exists a second predetermined number or more of such input points that a mobile vector calculated for each of the input points at every predetermined time has deflection within a predetermined range among the input points detected by the input point detecting circuitry and there exists a third predetermined number or more of such input points that a variation width of a distance between the input points in a predetermined time is a second predetermined value or less; and
range setting circuitry that sets, as the predetermined range to process the image, a region including each of the input points having the mobile vector within the predetermined deflection and having the second predetermined value or less variation width of the distance between the input points in the predetermined time, when the mode determining circuitry determines that it is the predetermined operation.

13. The command input system according to claim 7, wherein the operation determining circuitry includes:
region setting circuitry that selects one of the input points detected by the input point detecting circuitry as a remarkable input point one by one, and that sets a predetermined region centering the selected remarkable input point as a searching range of the remarkable input point;
input point calculating circuitry that assigns a weighting coefficient, which becomes smaller as a distance between an input point in the searching range and the remarkable input point becomes longer, to each input point existing in the searching range, and that calculates a total sum of the assigned weighting coefficients to each input point per every remarkable input point; and
mode determining circuitry that determines that a user's operation is the predetermined operation in a case where a number of the remarkable input points that the total calculated by the input point calculating circuitry is a first predetermined value or more is a predetermined threshold value or more.

14. The command input system according to claim 13, wherein the operation determining circuitry includes range setting circuitry that sets a region including respective input points included within an integration determining range having a reference position and a certain size where the reference position is a position of an input point having a maximum total value calculated by the input point calculating circuitry among the input points detected by the input point detecting circuitry as a range to perform a process to the image, when the mode determining circuitry determines that a user's touch operation is the predetermined operation.

15. The command input system according to claim 7, wherein the operation determining circuitry includes:
region setting circuitry that selects one of the input points detected by the input point detecting circuitry as a remarkable input point one by one, and that sets a predetermined region centering the selected remarkable input point as a searching range of the remarkable input point;
input point calculating circuitry that calculates a number of the input points existing in the searching range for every remarkable input point; and
mode determining circuitry that determines that a user's operation is the predetermined operation in a case where a number of the remarkable input points that the number of the input points calculated by the input point calculating circuitry is a first predetermined number or more is a predetermined threshold value or more.

16. The command input system according to claim 15, wherein the operation determining circuitry includes range setting circuitry that sets as an input range based on the input points.

17. The command input system according to claim 16, wherein the operation determining circuitry includes range setting circuitry that sets a region including respective input points within an integration determining range having a reference position and a certain size where the reference position is a position of an input point having a maximum value calculated by the input point calculating circuitry among the input points detected by the input point detecting circuitry as a range to perform a process to the image, when the mode determining circuitry determines that a user's touch operation is the predetermined operation.

* * * * *